US012669846B2

(12) United States Patent
Thome et al.

(10) Patent No.: US 12,669,846 B2
(45) Date of Patent: Jun. 30, 2026

(54) COMPUTING DEVICE AND ACCESSORY STORAGE SYSTEMS AND METHODS

(71) Applicant: Microsoft Technology Licensing, LLC, Redmond, WA (US)

(72) Inventors: Nathan Michael Thome, Kirkland, WA (US); Robyn Rebecca Reed McLaughlin, Seattle, WA (US); Lynda Anne Horton-Jones, Sammamish, WA (US); Whitney Anne Reed, Seattle, WA (US); Kaitlyn Marley Schoeck, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 18/564,454

(22) PCT Filed: May 26, 2022

(86) PCT No.: PCT/US2022/031164
§ 371 (c)(1),
(2) Date: Nov. 27, 2023

(87) PCT Pub. No.: WO2022/251521
PCT Pub. Date: Dec. 1, 2022

(65) Prior Publication Data
US 2024/0255988 A1     Aug. 1, 2024

(30) Foreign Application Priority Data
May 26, 2021     (NL) ..................................... 2028294

(51) Int. Cl.
*G06F 1/16* (2006.01)
*A45C 11/00* (2006.01)

(52) U.S. Cl.
CPC ............ *G06F 1/1607* (2013.01); *A45C 11/00* (2013.01); *G06F 1/1626* (2013.01); *A45C 11/003* (2025.01); *G06F 2200/1632* (2013.01)

(58) Field of Classification Search
CPC .... G06F 1/1607; G06F 1/1613; G06F 1/1615; G06F 1/1616; G06F 1/1626;
(Continued)

(56) References Cited

U.S. PATENT DOCUMENTS 9,144,279 B2 *     9/2015     Venida ................... A45C 11/34
10,135,480 B1     11/2018     Zaloom
(Continued)

FOREIGN PATENT DOCUMENTS

KR     20160001563 A *     1/2016     ............. G06F 3/041

OTHER PUBLICATIONS

International Search Report and Written Opinion received for PCT Application No. PCT/US22/031164, Sep. 7, 2022, 21 pages.
(Continued)

*Primary Examiner* — Gage Crum
(74) *Attorney, Agent, or Firm* — Ray Quinney & Nebeker P.C.; Paul N. Taylor

(57) ABSTRACT

A storage element for a computing device (304) includes a device sleeve (302) configured to receive a computing device. The device sleeve (302) includes an accessory slot (312) configured to receive a computing accessory (306). When the computing device (304) is inserted into the device sleeve (302), the accessory (306) is automatically inserted into the accessory slot (312). When the computing device (304) is removed from the device sleeve (302), the computing device (304) grabs, by magnetic attraction force, the accessory (306) and pulls it out of the device sleeve (302).

21 Claims, 18 Drawing Sheets

(58) Field of Classification Search
    CPC .... G06F 1/1628; G06F 1/1629; G06F 1/1632;
        G06F 1/1633; G06F 1/1647; G06F
        1/1649; G06F 1/165; G06F 1/1654; G06F
        1/1656; G06F 1/1658; G06F 1/1675;
        G06F 1/1684; G06F 1/169; G06F
        2200/1632; G06F 3/03545; A45C 11/00;
        A45C 11/003; H05K 5/02; H04M 1/04
    USPC ..................................................... 361/679.4
    See application file for complete search history.

(56) References Cited

U.S. PATENT DOCUMENTS

| | | | |
|---|---|---|---|
| 10,310,557 B1 * | 6/2019 | Wu ........................ | G06F 3/0416 |
| 10,372,169 B1 * | 8/2019 | Ferren ................... | G06F 1/1628 |
| 10,411,748 B1 * | 9/2019 | Lucente .................. | H04M 1/04 |
| 10,806,227 B1 * | 10/2020 | Medeiros ................ | G06F 3/039 |
| 11,184,989 B2 * | 11/2021 | Kang ....................... | G06F 3/039 |
| 12,433,383 B2 * | 10/2025 | Loureiro Benimeli ..................... | |
| | | | H04M 1/0202 |
| 2002/0190823 A1 * | 12/2002 | Yap ..................... | G06F 3/03545 |
| | | | 335/205 |
| 2006/0044288 A1 * | 3/2006 | Nakamura ........... | G06F 3/0338 |
| | | | 345/179 |
| 2007/0247793 A1 * | 10/2007 | Carnevali ............. | G06F 1/1656 |
| | | | 361/679.1 |
| 2009/0223845 A1 | 9/2009 | Bosma et al. | |
| 2011/0290687 A1 * | 12/2011 | Han ......................... | A45C 3/02 |
| | | | 206/320 |
| 2013/0050922 A1 | 2/2013 | Lee | |
| 2013/0301200 A1 * | 11/2013 | Leung ................... | G06F 1/1626 |
| | | | 361/679.4 |
| 2014/0077669 A1 | 3/2014 | Choi | |
| 2014/0118916 A1 * | 5/2014 | Lin ......................... | G06F 1/166 |
| | | | 361/679.09 |
| 2018/0053588 A1 * | 2/2018 | Barel .................. | G06F 3/04883 |
| 2018/0095653 A1 | 4/2018 | Hasek | |
| 2019/0036565 A1 * | 1/2019 | Nyholm .................. | H04M 1/21 |
| 2019/0278337 A1 * | 9/2019 | Hu ......................... | G06F 1/1677 |
| 2020/0089285 A1 * | 3/2020 | Gilbert .................. | G06F 1/1632 |
| 2020/0187612 A1 * | 6/2020 | Nyholm .................. | G06F 1/166 |
| 2021/0037666 A1 | 2/2021 | Kang | |
| 2021/0099025 A1 * | 4/2021 | Gaule .................. | H02J 7/0044 |

OTHER PUBLICATIONS

Search Report Issued in Netherland Patent Application No. N2028294, Feb. 8, 2022, 15 Pages.

Communication pursuant to Article 94(3) EPC received for European Patent Application No. 22730656.0, mailed on Feb. 2, 2026, 06 pages.

* cited by examiner

100

104

102

106

114

112

108

116

952

Remove a computing device from a device sleeve — 954

Remove an accessory from an accessory slot — 956

1058

Insert a computing device into a device sleeve — 1060

Insert an accessory into an accessory slot — 1062

COMPUTING DEVICE AND ACCESSORY STORAGE SYSTEMS AND METHODS

CROSS-REFERENCE TO RELATED APPLICATIONS

This application claims priority to Netherlands Patent Application No. 2028294, filed on May 26, 2022, the entirety of which is incorporated herein by reference.

BACKGROUND

Computing devices have become ubiquitous in recent years. In particular, computing devices have become more mobile, allowing users to take their computing devices anywhere desired. Many users transport computing devices in a storage element, such as a sleeve, backpack, bag, briefcase, purse, and so forth. Many computing devices may be utilized with separate computing accessories, such as a stylus, mouse, keyboard, and so forth.

BRIEF SUMMARY

In some embodiments, a storage element for a computing device includes a device sleeve configured to receive the computing device. The device sleeve includes an accessory slot configured to receive an accessory. When the computing device is stored in the storage element, a device magnet on the computing device is aligned with the accessory slot.

In some embodiments, a method for storing a computing device includes inserting the computing device into a device sleeve. An accessory magnetically connected to the computing device is automatically inserted into an accessory slot on the device sleeve. In some embodiments, a method includes removing the computing device from the device sleeve. A device magnet on the computing device grabs the accessory and pulls the accessory out of the accessory slot.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2 is a representation of a storage element having an accessory slot with a flared opening, according to at least one embodiment of the present disclosure;

FIG. 3-1 through FIG. 3-4 are representations of a storage sequence of a computing device shown from a cutaway side view, according to at least one embodiment of the present disclosure;

FIG. 4-1 and FIG. 4-2 are representations of a storage element including a tapered opening edge shown from a cutaway side view, according to at least one embodiment of the present disclosure;

FIG. 5 is a representation of a storage element shown from a cutaway side view, according to at least one embodiment of the present disclosure;

DETAILED DESCRIPTION

This disclosure generally relates to devices, systems, and methods for automatically storing and removing a computing accessory in a storage device based at least in part on a position of the computing device. A computing device may include an accessory that is secured to its outer surface. When the computing device is placed in a device sleeve, the accessory may be inserted into an accessory slot. When the computing device is removed from the device sleeve, the computing device may grab the accessory and pull it from the accessory slot. When the computing device is removed from the device sleeve, the accessory may remain connected to the computing device, which may prevent losing the accessory. In this manner, the accessory may be securely stored when the computing device is stored and may be accessible to the user when the user begins using the computing device. This may improve utilization of the accessory, thereby improving the user experience.

Figure 1:
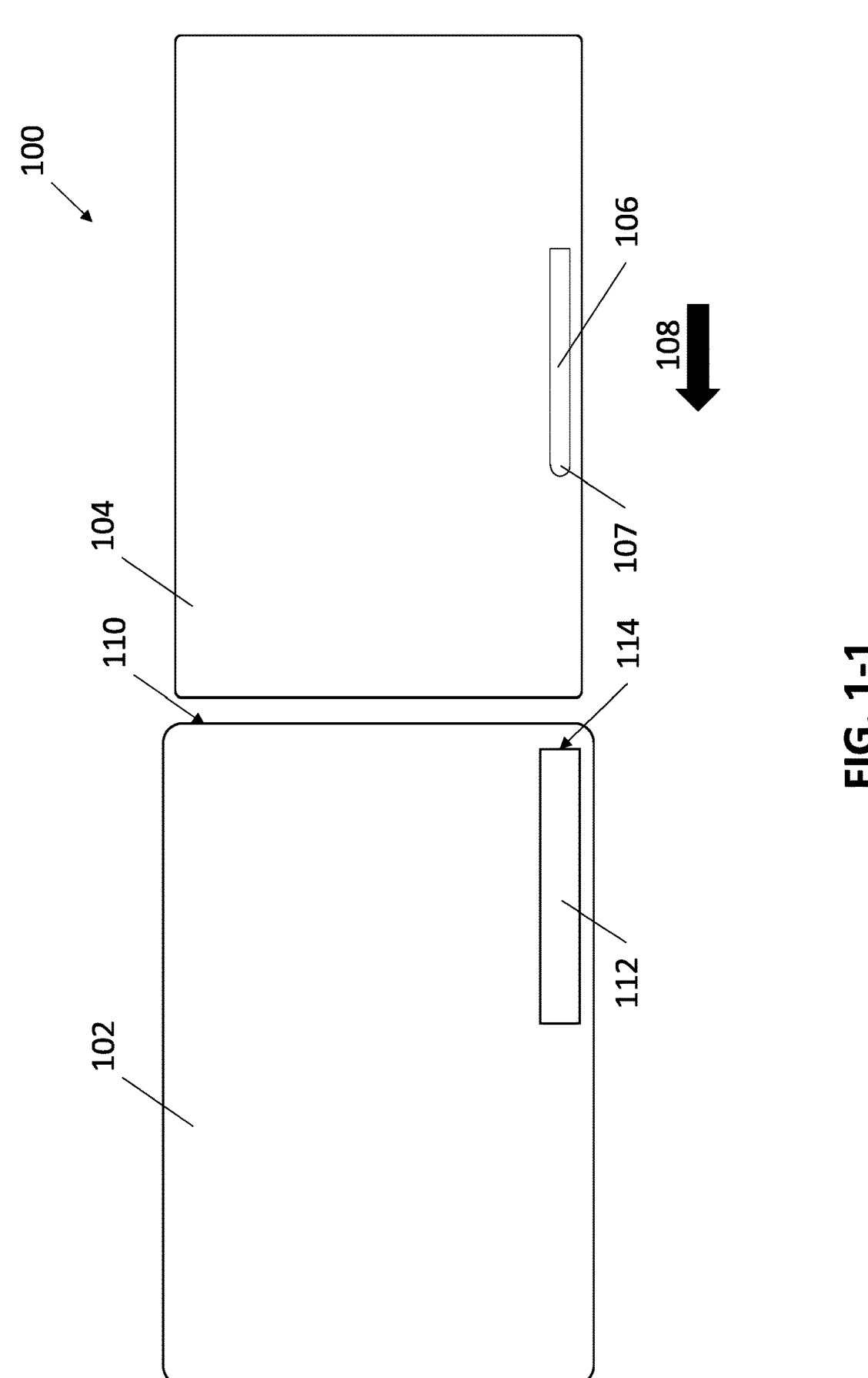
FIG. 1-1 through FIG. 1-5 are representations a storage sequence of a computing device, according to at least one embodiment of the present disclosure.

FIG. 1-1 is a representation of a storage element 100 including a device sleeve 102 and a computing device 104, according to at least one embodiment of the present disclosure. In some embodiments, the computing device 100 may be any type of computing device, including a laptop computer, a tablet, a mobile phone, a mobile device, a hybrid tablet/laptop computer, a multi-screen device, any other computing device, and combinations thereof.

In some embodiments, the device sleeve 102 may be configured to receive the computing device 104. For example, the device sleeve 102 may include at least a portion of the device sleeve 102 that is flexible. A flexible portion of the device sleeve may allow the device sleeve 102 to stretch to conform to the general shape of the computing device 104. This may provide the benefit of protecting the computing device 104. In some embodiments, the device sleeve 102 may surround one or more surfaces of the computing device 104 (e.g., may surround a top surface, a bottom surface, a left surface, a right surface, a front surface, a back surface, or combinations thereof). In some embodiments, the device sleeve 102 may surround all but one surface of the computing device 104 (e.g., may surround all but a top surface, a bottom surface, a left surface, a right surface, a front surface, or a back surface). In some embodiments, the device sleeve 102 may surround one or more edges of the computing device 104. In some embodiments, the device sleeve 102 may surround all but two adjacent edges of the computing device 104. The device sleeve 102 may be include woven materials, elastomeric materials, other flexible materials, or combinations thereof. A computing accessory 106 is connected to a surface of the computing device 104. In some embodiments, the accessory 106 may be connected to any surface of the computing device 104. For example, the accessory 106 may be connected to a top surface, a bottom surface, a side surface, or any other surface of the computing device 104.

In the embodiment shown, the accessory 106 is a stylus. Using the stylus, a user may interact with a screen on a computing device 104. For example, a tip 107 of the stylus may have a capacitive surface and the computing device 104 may have a touch screen display. When the capacitive surface contacts the touch screen display, the touch screen display may register the contact by the stylus as an input. This may allow the user to utilize the stylus as a conventional pen on the touch screen display. In some embodiments, the user may utilize the stylus in any manner, including cursor manipulation, object manipulation, drawing, writing, any other use, and combinations thereof.

In some embodiments, the accessory 106 may be any type of computing accessory, or any accessory that may allow the user to interact with and/or perform operations on or using the computing device 104. For example, the accessory 106 may include a keyboard, a mouse, a camera, a printer, a light, a display, a projector, a charging device (such as a cable, connector, contacts, plug, or other portion of a charging device), any other accessory, and combinations thereof. In some embodiments, the computing device 104 may have multiple connected accessories.

The accessory 106 may be connected to the computing device 104. In some embodiments, the accessory 106 may be magnetically connected to the computing device 104. For example, the accessory 106 may include one or more accessory magnets and the computing device may include one or more device magnets. The accessory magnets may be magnetically attracted to the device magnetics. The magnetic attraction between the device magnets and the accessory magnets may cause the accessory 106 to be magnetically connected to the computing device 104. In some embodiments, the magnetic connection between the accessory 106 and the computing device 104 may be stronger than the force of gravity such that the accessory 106 may be magnetically retained to the computing device 104 regardless of an orientation of the surface to which the accessory 106 is connected. This may provide the user with a convenient storage location, such as when the computing device 104 is being transported or otherwise moved and/or when the user is not using the accessory 106.

The computing device 104 may be stored in the device sleeve 102. In some embodiments, the device sleeve 102 may be an independent object. In some embodiments, the device sleeve 102 may be a part of a larger storage device. For example, a bag, such as a backpack or messenger bag, may include a device sleeve 102 into which a computing device 104 may be inserted. A device sleeve 102 may help to keep the computing device 104 in a particular portion of the bag or backpack. This may help to prevent damage to the computing device 104 and/or maintain an orderly and/or organized bag.

The device sleeve 102 may include an accessory slot 112 configured to receive the accessory 106. The accessory slot 112 may be configured and/or sized to receive the accessory 106. Put another way, the accessory 106 may be inserted into the accessory slot 112 for storage. For example, the accessory slot 112 may include at least a portion of the accessory slot 112 that is flexible. A flexible portion of the accessory slot 112 may allow the accessory slot 112 to stretch to conform to the general shape of the accessory 106. This may provide the benefit of protecting the accessory 106. In some embodiments, the accessory slot 112 may surround one or more surfaces of the accessory 106 (e.g., may surround a top surface, a bottom surface, a left surface, a right surface, a front surface, a back surface, or combinations thereof). In some embodiments, the accessory slot 112 may surround all but one surface of the accessory 106 (e.g., may surround all but a top surface, a bottom surface, a left surface, a right surface, a front surface, or a back surface). In some embodiments, the accessory slot 112 may surround one or more edges of the accessory 106. In some embodiments, the accessory slot 112 may surround all but two adjacent edges of the accessory 106. The accessory slot 112 may be include woven materials, elastomeric materials, other flexible materials, or combinations thereof. In some embodiments, the accessory slot 112 operates similar to the device sleeve 102. The accessory slot 112 may help to prevent the accessory 106 from being inadvertently lost while the computing device 104 is stored in the device sleeve 102 and/or in another location. In this manner, a user may be able to keep track of the accessory 106, either attached to the computing device 104 or secured within the accessory slot 112. For example, if the accessory 106 and the computing device 104 are both stored together in a single compartment (e.g., both devices only in a single sleeve), the accessory 106 may be separated from the computing device 104. Thus, when a user removes the computing device 104 from the single compartment, the accessory 106 may remain in the single compartment, as it has detached. When the accessory 106 is stored separately in the accessory slot 112, in at least one embodiment, removal of the computing device 104 results in removal of the accessory 106 (e.g., with the computing device 104) in its desired location relative to the computing device 104, rather than having to remove the accessory 106 separately and attach the accessory 106 to the computing device 104.

In some embodiments, to store the computing device 104, the computing device 104 may be inserted in a longitudinal insertion direction 108 into the device sleeve 102. The device sleeve 102 may include an opening 110. As the computing device 104 is moved in the insertion direction 108, the computing device 104 may move into the device sleeve 102 through the opening 110.

In some embodiments, the accessory slot 112 may be located on an outer surface of the device sleeve 102 that corresponds to the surface of the computing device 104 to which the accessory 106 is connected. In some embodiments, the accessory slot 112 may be aligned with the attachment position of the accessory 106 on the computing device 104. For example, the accessory slot 112 may be aligned in the insertion direction 108 with the device magnets on the computing device 104. In some embodiments, when the computing device 104 is located or stored in the device sleeve 102, the device magnets may be aligned with the accessory slot 112. In some embodiments, one or more edges of the accessory slot 112 may be parallel to two or more device magnets on the computing device 102. In some embodiments, the accessory slot 112 may orient the accessory 106 such that the accessory 106 is approximately parallel to two or more device magnets on the computing device 102. In other words, the accessory 106 may be less than 5 degrees from parallel to two or more device magnets on the computing device 102.

When the computing device 104 is being stored, a user may insert the computing device 104 into the device sleeve 102 through the opening 110. The user may move the computing device 104 into the device sleeve 102 until the accessory 106 contacts the accessory slot 112. The tip 107 of the accessory 106 may be inserted into the accessory slot 112. For example, the tip 107 may be inserted into a slot opening 114 of the accessory slot 112, as may be seen in FIG. 1-2.

Figures 1, 2:
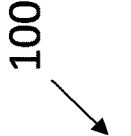

As may be seen in FIG. 1-2, when the computing device 104 is partially inserted into the device sleeve 102, the accessory 106 may be partially inserted into the accessory slot 112. The connection mechanism between the accessory 106 and the computing device 104 may have a connection strength, which may be the amount of force used to detach the accessory 106 from the computing device 104. As the accessory 106 is inserted into the accessory slot 112, the connection strength between the computing device 104 and the accessory 106 may be large enough to overcome any insertion resistance from the accessory slot 112 that resists insertion of the accessory 106. Put another way, the connection strength may be sufficient to push the accessory 106 into the accessory slot 112 without prematurely dislodging or disconnecting the accessory 106 from the computing device (e.g., before the accessory 106 is secured within the accessory slot).

As the computing device 104 is inserted further into the device sleeve 102, the accessory 106 may be inserted further into the accessory slot 112. In some embodiments, as the accessory 106 is inserted further into the accessory slot 112, the connection force between the computing device 104 and the accessory 106 may decrease. In some embodiments, the connection force may be decreased sufficiently that the accessory 106 is disconnected from the computing device 104. In some embodiments, accessory 106 may encounter an end of the accessory slot 112. This may prevent further movement of the accessory 106. As the computing device 104 is inserted further into the device sleeve 102, because the accessory 106 cannot move any further into the accessory slot 112, the accessory 106 may become dislodged from the connection mechanism and the computing device 104 may move the rest of the way into the device sleeve 102. As may be seen in FIG. 1-3, the accessory 106 may be inserted into the accessory slot 112 and located in a different position relative to the computing device. While the accessory 106 may not be directly connected to the computing device 104, the accessory 106 may be securely stored within the accessory slot. This may help the user prevent loss of the accessory 106.

In some embodiments, the accessory 106 may be automatically connected to the computing device 104 when the computing device 104 is removed from the device sleeve 102. For example, the computing device 104 may be removed from the device sleeve by moving the computing device 104 relative to the device sleeve 102 in a longitudinal removal direction 116. In some embodiments, removing the computing device 104 may include laterally removing the computing device 104 in the removal direction 116. In some embodiments, the removal direction may be laterally parallel to the computing device. In some embodiments, the removal direction 116 may be parallel with an orientation of the accessory 106. When the computing device 104 has been removed so that the connection mechanism is realigned with the accessory 106. The connection mechanism may connect the computing device 104 to the accessory 106. As the computing device 104 is moved further in the removal direction 116, such as into the position shown in FIG. 1-2, the accessory 106 may begin to be removed from the accessory slot 112.

When the computing device 104 is completely removed from the device sleeve, the accessory 106 may be removed from the accessory slot 112 and be connected to the computing device 104, as may be seen in FIG. 1-1. In this manner, when the user wishes to use the computing device 104, the user may remove the computing device 104 from the device sleeve 102 and simultaneously remove the accessory 106 from the device sleeve 102. This may help the user to keep track of the accessory 106. In some embodiments, this may allow the user to automatically store and retrieve the accessory 106 without performing an extra action, such as separately storing the accessory 106. This may help to prevent loss and/or harm to the accessory 106 by inadvertent dislodging of the accessory 106 from the computing device 104. In this manner, a user may be able to utilize the accessory 106 when desired, without spending time searching for the accessory.

In the embodiment shown, at least a portion of the accessory 106 may extend past the slot opening 114. This may allow the user to insert and/or remove the accessory 106 from the accessory slot 112 manually. This may increase the flexibility of the device sleeve 102 allowing the user to choose to remove or retain the accessory 106 in the accessory slot.

FIG. 1-4 is a representation of the storage element 100 with a device sleeve 102 having an accessory slot 112 located above the device magnets of the computing device 104 when the computing device 104 is inserted into the device sleeve 102. When inserting the computing device 104 into the device sleeve 102, the device magnets may retain magnetic connection to the accessory 106 even after the accessory 106 has detached from the computing device 104 and the device sleeve 102 is located between the computing device 104 and the accessory 106. After the accessory 106 is inserted into the accessory slot 112, the device magnets from the computing device 104 may retain the accessory 106 in the accessory slot 112. Thus, in the embodiment shown, the accessory 106 may never become disconnected from the computing device 104 while the computing device 104 and the accessory are being stored. In some embodiments, the connection of the accessory 106 to the computing device 104 while stored in the accessory slot 112 may allow the computing device 104 to charge the accessory 106, such as through a wireless charging mechanism.

FIG. 1-5 is a representation of the storage element 100 with an accessory 109 that is a representation of mouse, such as a wireless mouse or other mouse. As may be seen in a comparison between FIG. 1-1 and FIG. 1-5, the accessory 109 is larger in width than the accessory 106. The accessory slot 112 has been sized accordingly, and is sized to fit the accessory 109. In some embodiments, the accessory 109 may include any other accessories. Furthermore, it should be understood that the device sleeve 102 may include multiple accessory slots 112.

FIG. 2 is a representation of a storage element 200 having a device sleeve 202 and a computing device 204, according to at least one embodiment of the present disclosure. An accessory 206 is connected to the computing device 204 with a connection mechanism, such as a magnetic connection. The device sleeve 202 includes an accessory slot 212. When the computing device 204 is inserted into the device sleeve 202, the accessory 206 may be inserted into and stored in the accessory slot.

In some situations, a tip 207 of the accessory 206 may not be completely aligned with the accessory slot. In some embodiments, the accessory slot 212 may include a slot head 218 that enlarges the slot opening 214 of the accessory slot 212. A larger slot opening 214 may provide a larger area for the tip 207 to enter the accessory slot 212. In this manner, the accessory 206 may not be inadvertently dislodged from the computing device 204 by not entering the accessory slot 212 due to a misalignment of the accessory 206 and the accessory slot 212.

In some embodiments, the slot head 218 may be a flared head. For example, the slot head 218 may increase the width of the slot opening 214 relative to a width of a main body of the accessory slot 212. In some examples, the slot head 218 may increase the height of the slot opening 214 relative to a height of the main body of the accessory slot 212. In some embodiments, the flared head of the slot head 218 may increase both the width and the height of the slot opening 214.

In some embodiments, the slot head 218 may be formed from a material that may retain its form. This may allow the slot opening 214 to remain open for use, instead of being crushed or otherwise moved, thereby reducing the effective area of the slot opening 214. For example, the slot head 218 may be formed from an elastically deformable material that returns to an original shape after deformation. In some embodiments, the slot head 218 may be formed from a rigid material that may not deform during use. In this manner, a form retaining slot head 218 may keep the slot opening 214 open. This may allow the user to store the accessory 206 in the accessory slot 212 without manually adjusting and/or holding open the slot opening 214 of the slot head 218.

Figures 1, 2, 3:
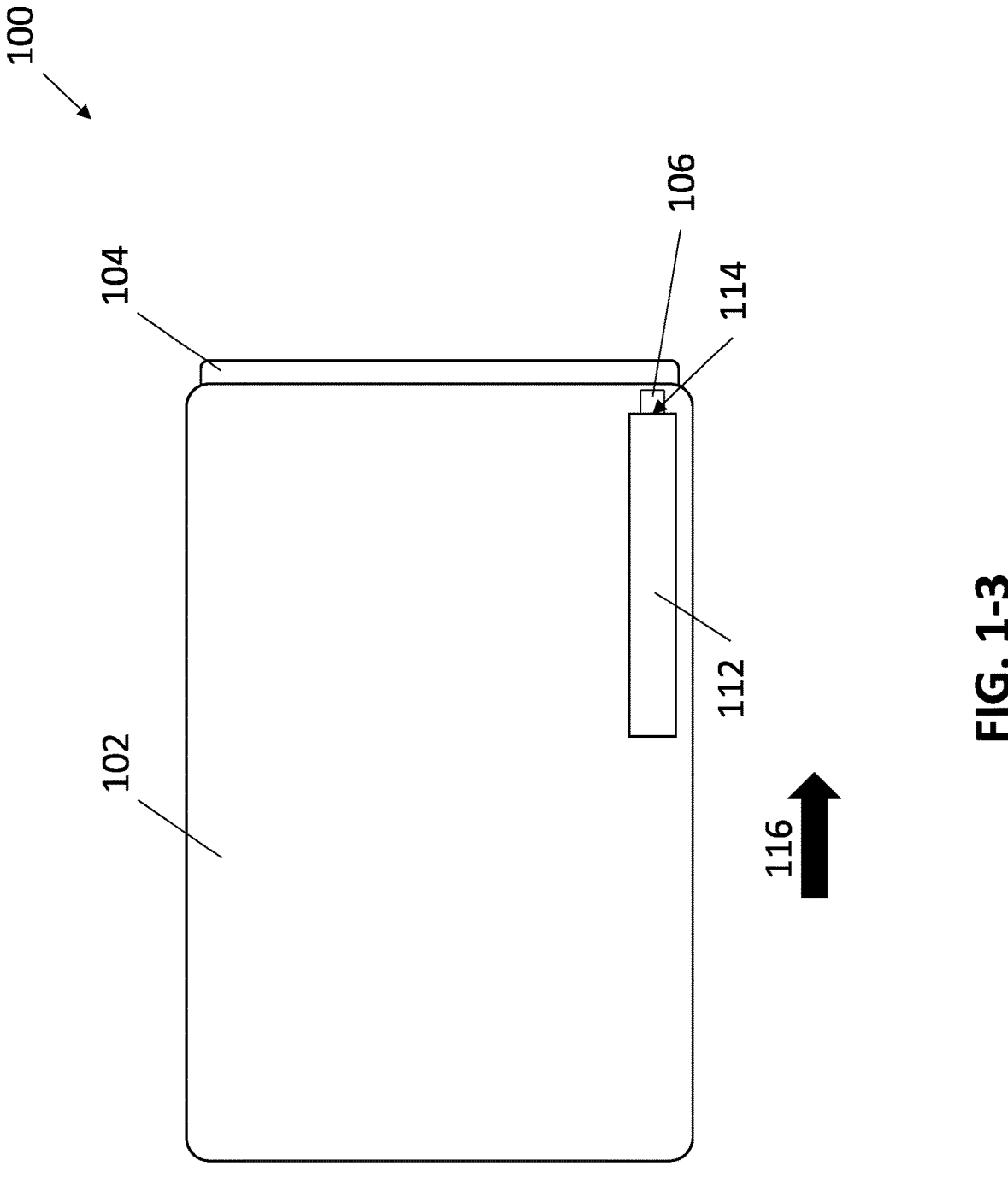
Figures 1, 2, 3, 4:
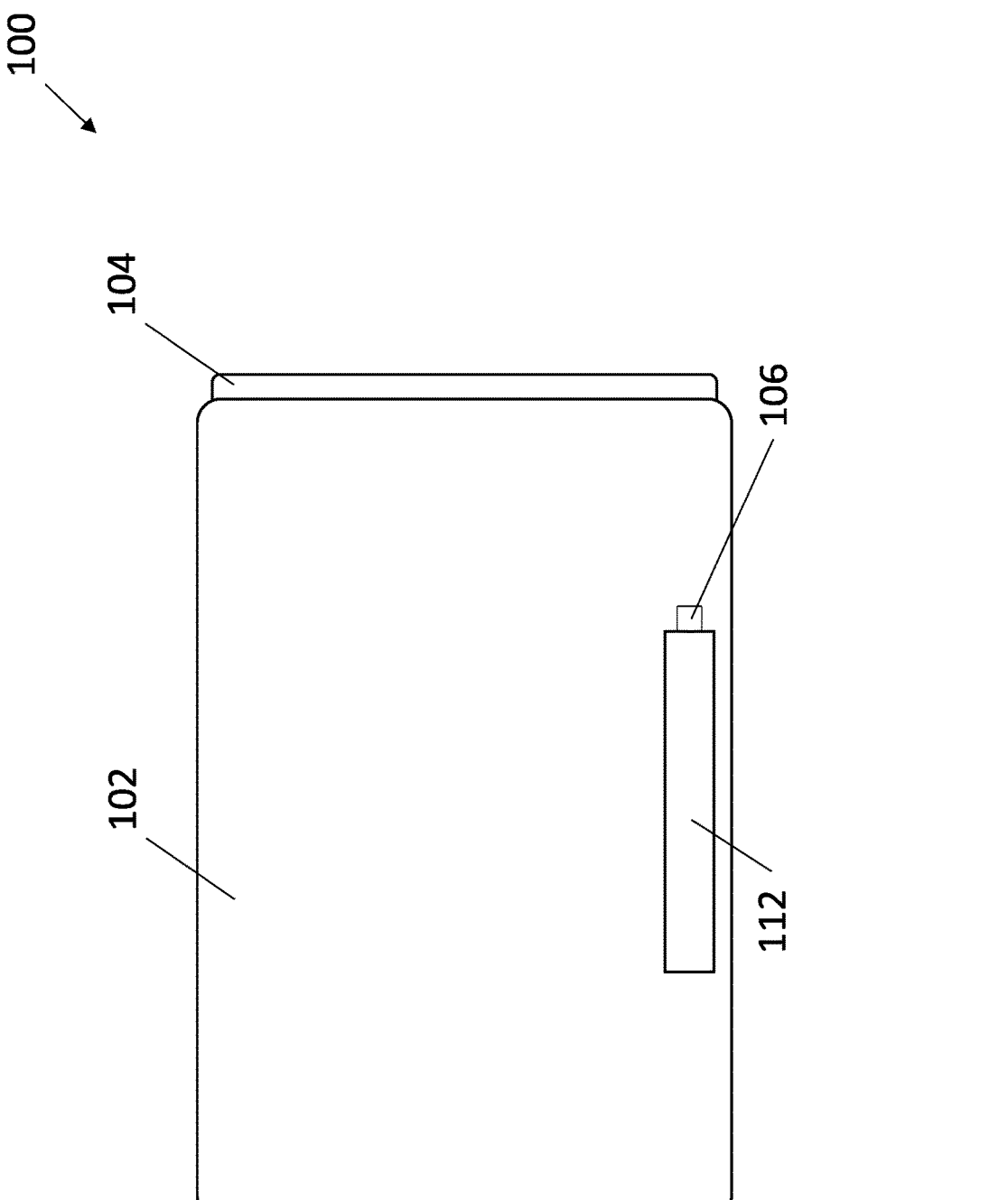

FIG. 3-1 through FIG. 3-4 are representations of a side cut-away view of removal sequence of the removal of a computing device 304 from a device sleeve 302, according to at least one embodiment of the present disclosure. In FIG. 3-1, the computing device 304 is installed in a pocket 320 formed by an upper member 321, a lower member 322, and a back member 323 of the device sleeve 302. The pocket 320 may be open at an opening 310. The computing device 304 may be inserted into and/or removed from the pocket 320 through the opening 310.

The device sleeve 302 includes an accessory slot 312. In the view shown in FIG. 3-1, an accessory 306 is stored in the accessory slot 312. The accessory 306 may be retained within the accessory slot 312 using a slot retention mechanism. The slot retention mechanism may be any type of retention mechanism, such as a magnetic connection, a latch, a pin, a press-fit (e.g., where an opening of the accessory slot 312 has at least one dimension that is smaller than the corresponding dimension of the accessory 306 such that the accessory 306 must be pushed into the accessory slot 312, thereby expanding the accessory slot 312 and/or compressing the accessory 306 in the corresponding dimension), a friction fit (e.g., where friction between a material of the accessory slot 312 and a material of the accessory 306 retains the accessory 306 in the accessory slot 312), a clasp, a latch, a flap, a covering, any other retention mechanism, and combinations thereof. For example, the retention mechanism may include a combination of magnetic retention and friction fit or press fit retention, or any other combination. The combination of multiple retention mechanisms may result in a total removal force, which may be the total amount of force used to remove the accessory 306. For ease of illustration, discussions herein which reference a "removal force" may refer to the total removal force, inclusive of all combined retention mechanism.

In the embodiment shown, the slot retention mechanism between the accessory slot 312 and the accessory 306 is a magnetic retention mechanism. The accessory 306 includes one or more accessory magnets (collectively 324). The accessory slot 312 includes a slot magnet 326. Magnetic attraction between the slot magnet 326 and a first accessory magnet 324-1 may provide a retention force to retain the first accessory magnet 324-1 within the accessory slot 312, regardless of an orientation of the accessory slot 312. In the embodiment shown, the slot magnet 326 is aligned with the first accessory magnet 324-1, which may be located at a tip of the accessory 306. However, it should be understood that the slot magnet 326 may be aligned with any other magnet on the accessory 306, such as the second accessory magnet 324-2.

In some embodiments, the slot magnet 326 may be positioned and/or sized such that it may magnetically retain the accessory 306 in the accessory slot 312 regardless of an orientation of the accessory 306. Put another way, the slot magnet 326 may be positioned and/or sized such that it may magnetically retain the accessory 306 using either the first accessory magnet 324-1 or the second accessory magnet 324-2. For example, in the embodiment shown, the first accessory magnet 324-1 is inserted further into the accessory slot 312 than the second accessory magnet 324-2. The slot magnet 326 may be located at or near a slot end 328 so that the slot magnet 326 aligns with the first accessory magnet 324-1 when the accessory 306 is fully inserted into the accessory slot 312. In some embodiments, the second accessory magnet 324-2 may be inserted further into the accessory slot 312 than the first accessory magnet 324-1. The slot magnet 326 may be positioned and/or sized such that, when the second accessory magnet 324-2 is inserted all the way to the slot end 328, the slot magnet 326 may magnetically engage with the second accessory magnet 324-2. In this manner, regardless of which accessory magnet 324 is inserted first or further into the accessory slot 312, the slot magnet 326 may help to retain the accessory 306 in the accessory slot.

In some embodiments, the slot magnet 326 may be located at or near a slot opening 314 of the accessory slot 312 so that the slot magnet 326 engages the second accessory magnet 324-2. In some embodiments, the slot magnet 326 may connect to a single accessory magnet 324. In some embodiments, the slot magnet 326 may connect to both the first accessory magnet 324-1 and the second accessory magnet 324-2. In some embodiments, the slot magnet 326 may extend from the slot end 328 to the slot opening 314. In some embodiments, the accessory slot 312 may include multiple slot magnets 326 spaced between the slot end 328 and the slot opening 314. In some embodiments, the accessory 306 may include a different number of accessory magnets 324 than shown, such as 1, 3, 4, 5, 6, 7, 8, 9, 10, or more accessory magnets 324. The number, size, and/or placement of the slot magnets 326 may be critical to allowing the accessory slot 312 to retain the accessory 306 in any orientation. In some embodiments, the number, size, and/or placement of the slot magnets 326 may increase the versatility of the accessory slot 312 by allowing different types of accessories to be stored in the accessory slot 312.

To remove the computing device 304 from the device sleeve 302, the computing device 304 may be moved in the removal direction 316, as seen in FIG. 3-2. The computing device 304 includes one or more device magnets (collectively 330). As described above, the device magnets 330 may engage with the accessory magnets 324 to secure the accessory 306 to the computing device 304 when the computing device 304 is not stored in the device sleeve 302. For example, in the un-stored position, a first device magnet 330-1 may magnetically interact with the first accessory magnet 324-1 and a second device magnet 330-2 may magnetically interact with the second accessory magnet 324-2 to magnetically secure the accessory 306 to computing device 304. In the embodiment shown, the device magnets 330 and the accessory magnets 324 are spaced such that the first device magnet 330-1 may magnetically interact with the second accessory magnet 324-2 and the second device magnet 330-2 may magnetically interact with the first accessory magnet 324-1 to magnetically secure the accessory 306 to the computing device 304.

In FIG. 3-2, the computing device 304 has been partially removed so that the second device magnet 330-2 is aligned with the first accessory magnet 324-1. In some embodiments, the upper member 321 may be magnetically permeable such that the device magnets 330 may magnetically interact with the accessory magnets 324, with a magnetic force based at least in part on a member thickness 332 of the upper member 321. In some embodiments, a magnetically permeable upper member 321 may help to reduce any magnetic resistance between the device magnets 330 and the accessory magnets 324. This may help the device magnets 330 to interact with the accessory magnets 324 when removing the computing device 304 from the device sleeve 302. Put another way, a magnetically permeable upper member 321 may increase the magnetic force between the device magnets 330 and the accessory magnets 324 when the computing device 304 is being removed from the device sleeve 302. This may help the computing device 304 to more reliably remove the accessory 306 from the accessory slot 312.

In the partially removed position shown in FIG. 3-2, the second device magnet 330-2 may magnetically interact with the first accessory magnet 324-1. The slot magnet 326 may also be magnetically interacting with the first accessory magnet 324-1. As the computing device 304 is moved in the removal direction 316, device magnetic force between the second device magnet 330-2 may apply a removal force on the accessory 306. The slot magnet 326 may apply a retention force on the accessory 306. In some embodiments, the magnetic attraction between the slot magnet 326 and the first accessory magnet 324-1 may be less than the magnetic attraction between the second device magnet 330-2 and the first accessory magnet 324-1 (e.g., the removal force may be greater than the retention force). As the computing device 304 is removed from the pocket 320 of the device sleeve 302, the accessory 306 may be moved in the removal direction 316 out of the accessory slot 312. In some embodiments, this removal may continue until the accessory 306 is completely out of the accessory slot 312. In some embodiments, the accessory 306 may then be magnetically secured to the computing device 304. In some embodiments, the slot magnet 326 may connect to the accessory magnets 324 with a lower magnetic force than the accessory magnets 324 connect to the device magnets 330. A slot magnet 326 having a lower magnetic connection with the accessory magnets 324 may help to maintain the accessory 306 in the accessory slot 312 while still allowing the device magnets 330 to "grab" or magnetically remove the accessory 306 from the accessory slot 312 when the computing device 304 is being removed from the device sleeve 302.

In some embodiments, the magnetic attraction between the slot magnet 326 and the first accessory magnet 324-1 may be greater than the magnetic attraction between the second device magnet 330-2 and the first accessory magnet 324-1 (e.g., the removal force may be lower than the retention force). As the computing device 304 is moved further out of the pocket 320 of the device sleeve 302, the accessory 306 may stay in the same position in the accessory slot 312. As the computing device 304 continues to move in the removal direction 316, the computing device may move into the position shown in FIG. 3-3.

In FIG. 3-3, because the retention force of the accessory slot 312 was greater than the removal force between the second device magnet 330-2 and the first accessory magnet 324-1, the accessory 306 stayed in the accessory slot 312 as the computing device 304 moved in the removal direction 316. In the position shown, the computing device 304 has moved such that the first device magnet 330-1 is aligned with the first accessory magnet 324-1 and the second device magnet 330-2 is aligned with the second accessory magnet 324-2. This may cause the first device magnet 330-1 to magnetically interact with the first accessory magnet 324-1 and the second device magnet 330-2 to magnetically interact with the second accessory magnet 324-2. As the computing device is moved further in the removal direction 316, the magnetic interactions between the device magnets 330 and the accessory magnets 324 may result in a removal force that is greater than the retention force caused by the magnetic interaction of the slot magnet 326 and the first accessory magnet 324-1 (and any other retention mechanism, including a friction fit and/or a press fit). As the computing device 304 is moved further out of the device sleeve 302 in the removal direction 316, the removal force may cause the accessory 306 to be pulled out of the accessory slot 312.

In the view shown in FIG. 3-4, the accessory 306 has been pulled out of the accessory slot 312. As the computing device 304 is moved further in the removal direction 316, the connection between the accessory 306 and the accessory slot 312 has been broken (e.g., the connection mechanism has been released) so that the accessory 306 may be removed from the accessory slot 312. In the embodiment shown, the magnetic connection between the slot magnet 326 and the first accessory magnet 324-1 was broken when the device magnets 330 were moved in the removal direction 316, with the removal magnetic force between the device magnets 330 and the accessory magnets 324 overriding the retention force (magnetic and otherwise), including the magnetic force between the slot magnet 326 and the first accessory magnet 324-1.

As the accessory 306 is pulled out of the accessory slot 312, the magnetic force between the device magnets 330 and the accessory magnets 324 may pull the accessory 306 toward the computing device 304. When the accessory 306 is pulled out of the accessory slot 312, the accessory 306 may be secured to the computing device 304. In this manner, the accessory 306 may automatically attach to the computing device 304 when the computing device 304 is removed from the device sleeve 302. This may help the user to keep track of the accessory 306 when preparing to use the computing device 304. Furthermore, this may conveniently provide the user with the accessory 306 when the user is ready to use the computing device without the user searching through his or her bag, pockets, behind his or her ear, or any other location the user may have placed the accessory 306. This may improve the user experience by allowing the user to always have access to the accessory 306 when needed.

As may be seen in FIG. 3-4, in some embodiments, the accessory 306 may be removed from the accessory slot 312 and attached to the computing device 304 before the computing device 304 is completely removed from the pocket 320 of the device sleeve 302. However, it should be understood that the accessory 306 may be removed from the accessory slot 312 at the same time the computing device 304 is removed from the pocket 320, or after the computing device 304 is removed from the pocket 320, based at least in part on the relative positions, size, orientations, and removal strengths of the computing device 304, the accessory slot 312, the accessory 306, and the connection mechanism.

In some embodiments, a storage sequence of the computing device 304 and the accessory 306 may be represented by the sequence shown in FIG. 3-4 through FIG. 3-1 (e.g., the reverse order of the sequence discussed above). In some embodiments, when a user wishes to store the computing device 304 the accessory 306, the user may insert the computing device 304 into the device sleeve 302 until they are in the position shown in FIG. 3-4. The computing device 304 may be further moved in the installation direction 308 until the accessory 306 contacts an opening edge 334 of the device sleeve 302. Contact with the opening edge 334 may cause the accessory 306 to at least partially separate from the computing device 304. Put another way, the upper member 321 may push the accessory 306 away from the computing device 304 as the computing device 304 and the accessory 306 is moved in the installation direction 308.

In some embodiments, the accessory 306 may be pushed into the accessory slot 312 as the computing device 304 is moved in the installation direction 308. The accessory 306 may move into the accessory slot 312 further and further until the accessory 306 is no longer physically contacting the computing device and is inserted into the accessory slot 312 in the position shown in FIG. 3-3. At this time, the slot magnet 326 may engage one both of the accessory magnets 324. In some embodiments, the accessory 306 may be fully inserted into the accessory slot 312 until the accessory 306 cannot move any further in the installation direction 308.

As the computing device 304 is inserted further into the device sleeve 302, such as into the position shown in FIG. 3-2, the connection between the device magnets 330 and the accessory magnets 324 may at least partially break, until computing device 304 is in the fully installed position shown in FIG. 3-1. In this manner, the accessory 306 may automatically be stored in the accessory slot 312 when the computing device 304 is stored in the device sleeve 302. This may help the user to keep track of the accessory 306 when not in use and/or in storage. This may further help prevent the accessory 306 from being damaged by storing it in a secure location.

As may be seen in an examination of the removal and storage sequences shown by FIG. 3-1 through FIG. 3-4, embodiments of the present disclosure allow a user to conveniently store and retrieve an accessory 306 without additional motions or actions from the user. This may help the user to keep track of the accessory 306 so that the user may use the accessory 306 when desired, without searching for it. This may improve implementation of the accessory 306. In this manner, embodiments of the present disclosure may improve the user experience.

In the embodiments shown, the accessory slot 312 is located on an outer surface of the device sleeve 302. Put another way, the accessory slot 312 shown is on a surface of the upper member 321 opposite the pocket 320 where the computing device 304 is stored. In some embodiments, the accessory slot 312 may be located on an inner surface of the device sleeve 302. For example, the accessory slot 312 may include a piece of fabric or other material secured to the device sleeve 302 within the pocket 320. This may help to further protect the accessory 306 during storage and reduce inadvertent removal of the accessory 306.

FIG. 4-1 and FIG. 4-2 are representations of a storage element 400 having a device sleeve 402 having a tapered opening edge 434, according to at least one embodiment of the present disclosure. In FIG. 4-1, a computing device 404 is partially inserted into the device sleeve 402. The device sleeve 420 includes an upper member 421. The upper member 421 includes an opening edge 434 located at the opening of the device sleeve 402. In the embodiment shown, the opening edge 434 is tapered. Put another way, a member thickness 432 of the upper member 421 may decrease in thickness at the opening edge 434. In some embodiments, the tapered portion of the opening edge 434 may be located at a slot opening 414 of the accessory slot 412. In some embodiments, the tapered portion of the opening edge 434 may only be located at the slot opening 414 of the accessory slot 412. In some embodiments, the tapered portion of the opening edge may be located along an entirety of a length of the upper member 421.

The tapered portion of the opening edge 434 may help to ease the insertion of the accessory 406 into the accessory slot 412. When the accessory 406 encounters the opening edge 434, a blunt edge at the opening edge 434 may push the accessory 406 out of alignment, such that accessory magnets (collectively 424) on the accessory 406 disengage with device magnets (collectively 430) on the computing device 404. A tapered edge on the opening edge 434 may be able to slip underneath the accessory 406 at a tip 407 of the accessory 406. As the computing device 404 is moved in the insertion direction 408, the tapered opening edge 434 may separate the accessory 406 from the computing device 404, allowing more of the accessory 406 to be inserted into the accessory slot 412.

In the embodiment shown in FIG. 4-2, the tapered opening edge 434 has partially separated the accessory 406 from the computing device 404. Specifically, the tapered opening edge 434 has pushed apart the first accessory magnet 424-1 from the first device magnet 430-1. In some embodiments, this may weaken and/or sever the connection between the first accessory magnet 424-1 and the first device magnet 430-1. In the position shown in FIG. 4-2, the second accessory magnet 424-2 is still close to, but beginning to separate from, the second device magnet 430-2. As the computing device 404 is inserted further into the device sleeve 402, the connection between the second accessory magnet 424-2 and the second device magnet 430-2 may remain strong enough to help push the accessory 406 all the way into the accessory slot 412. Including a tapered edge at the opening edge 434 may help make insertion into the accessory slot easier and/or more reliable, thereby reducing the chance that the accessory 406 may be dislodged when attempting to store the computing device 404 and the accessory 406.

Figures 1, 2, 3, 4, 5:
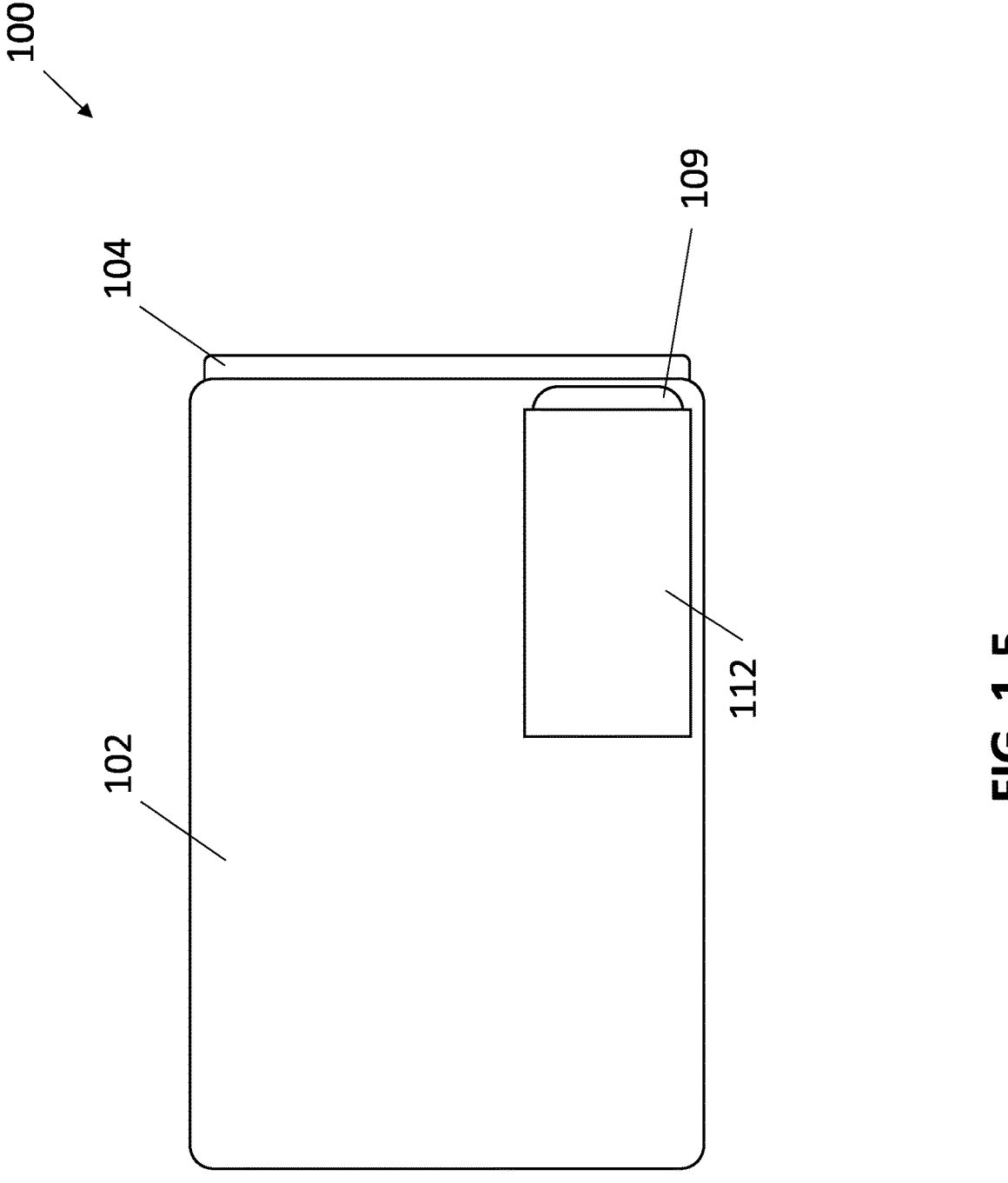
Figure 2:
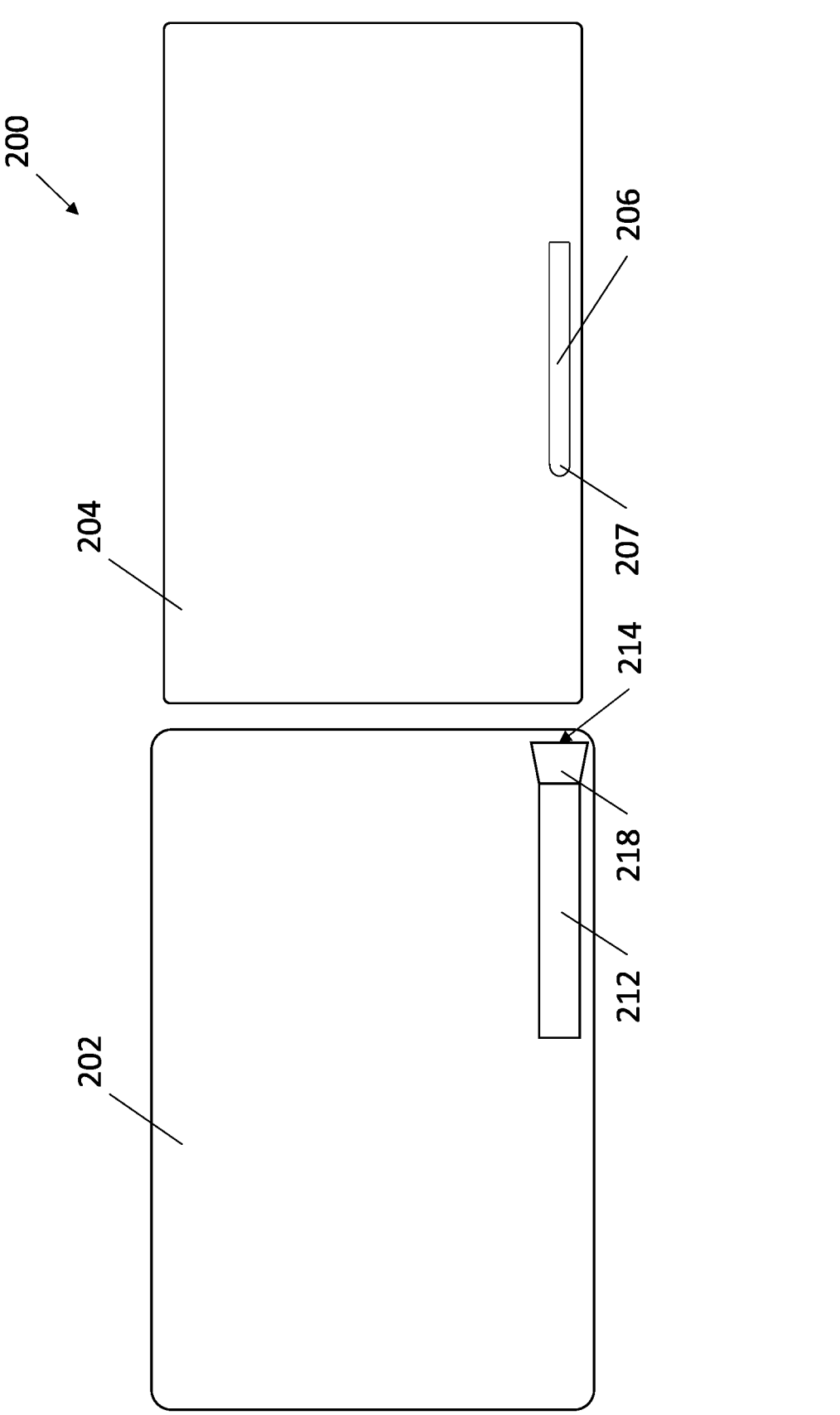
Figures 1, 3:
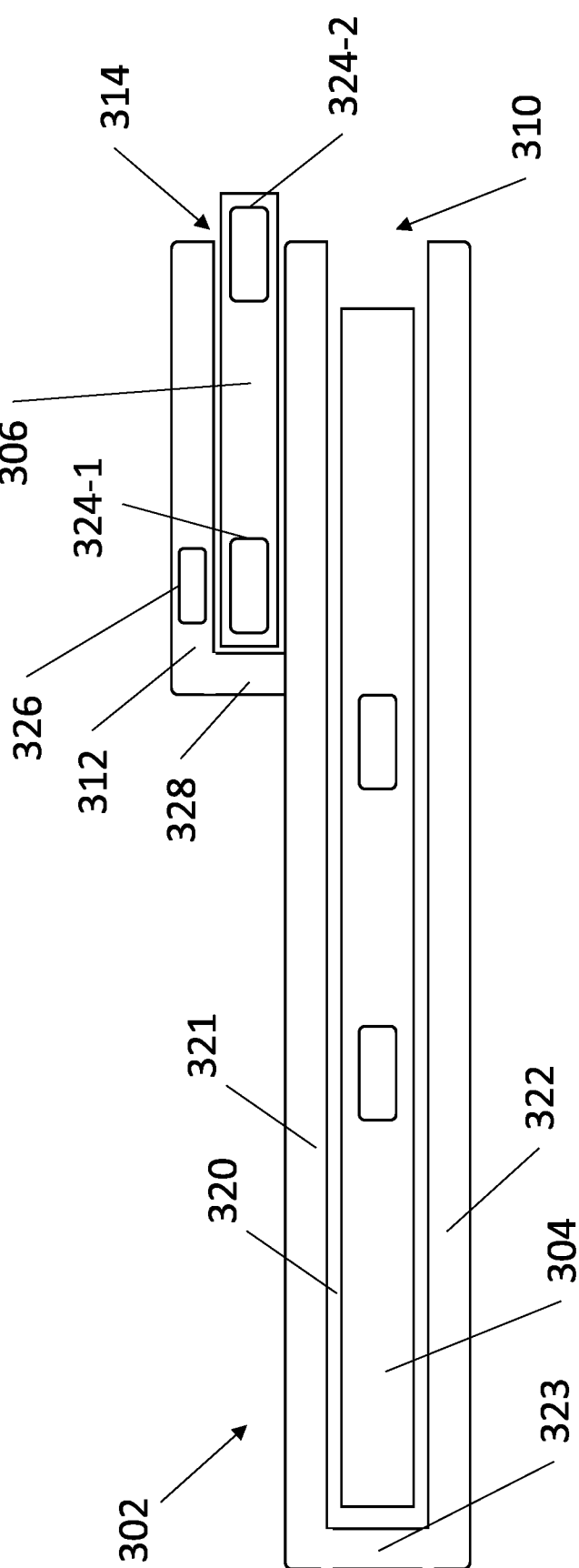
Figures 2, 3:
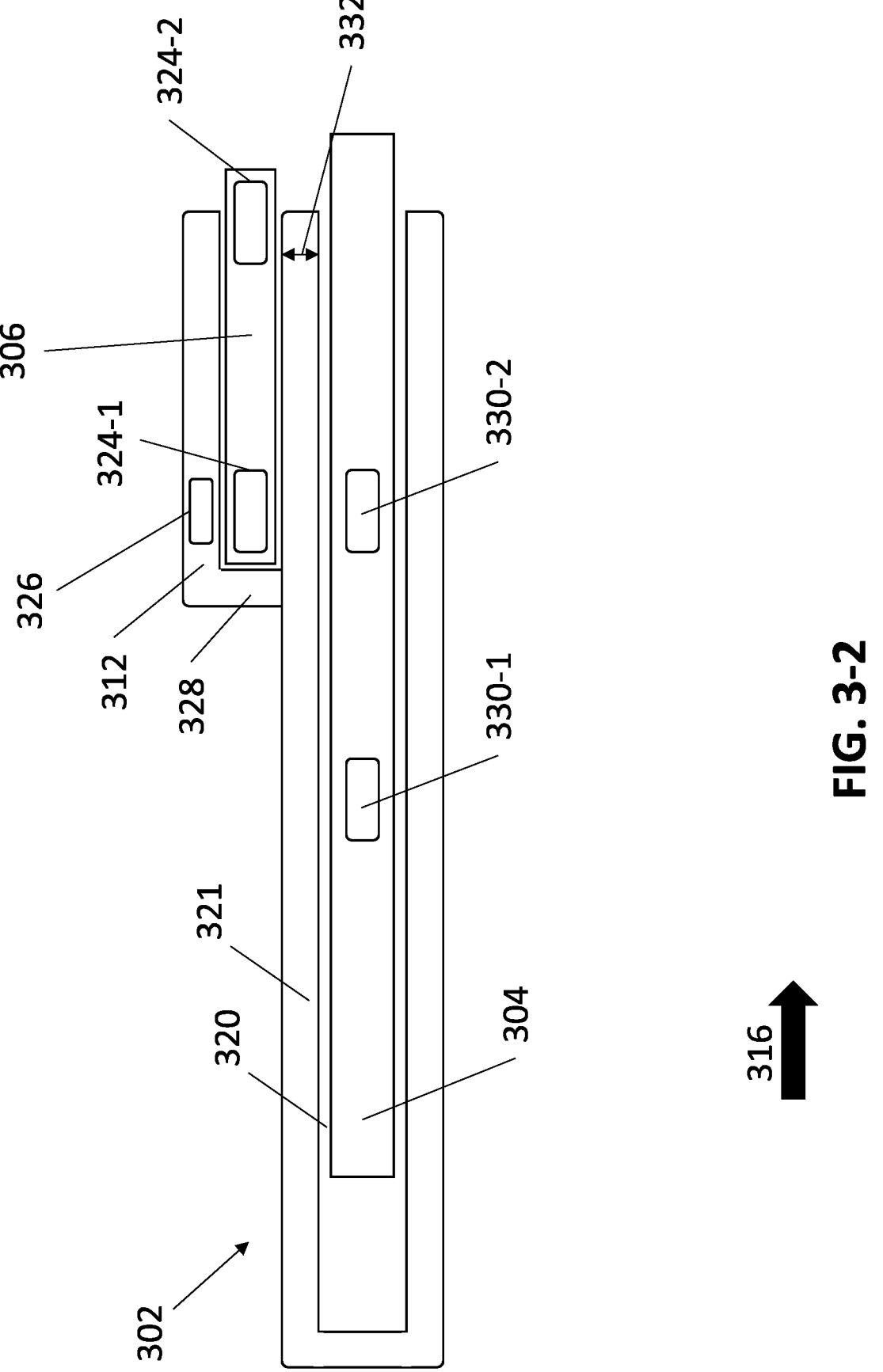
Figure 3:
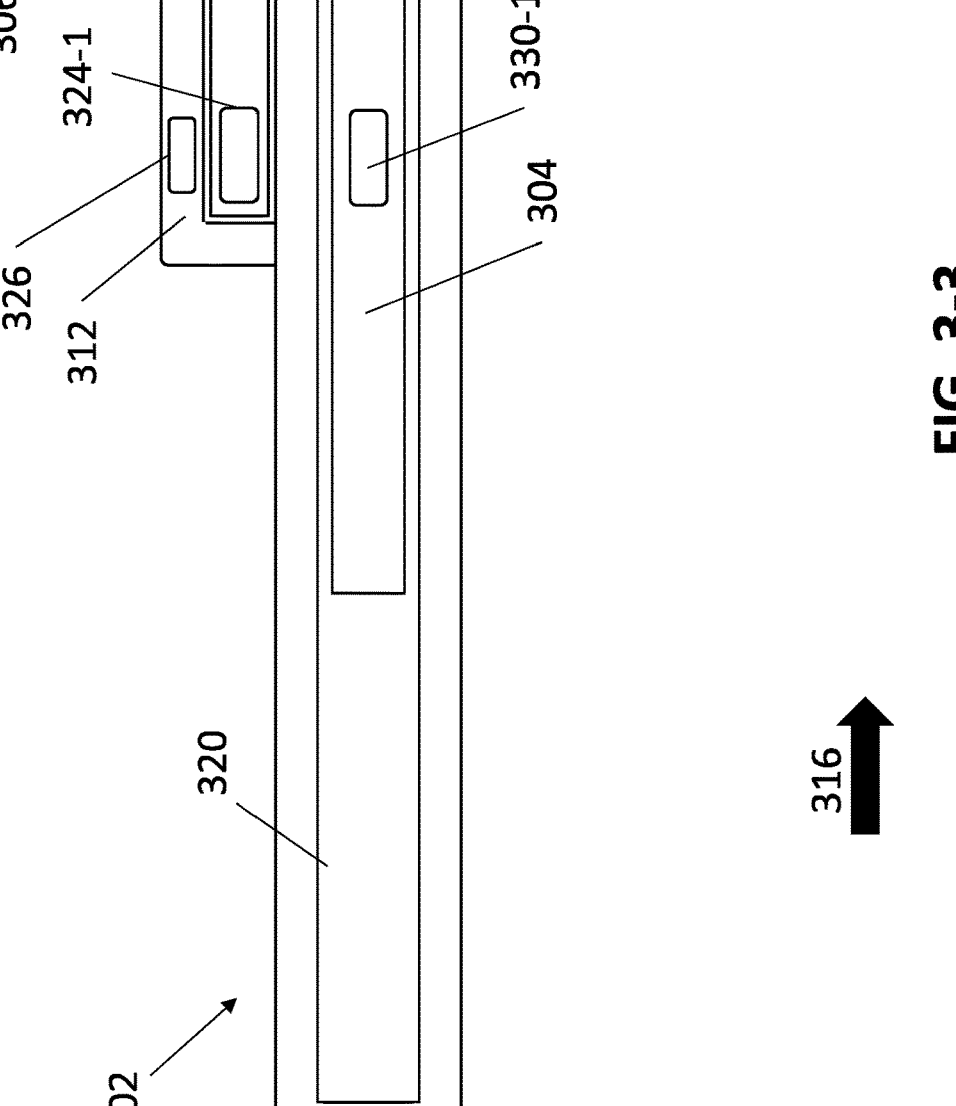
Figures 3, 4:
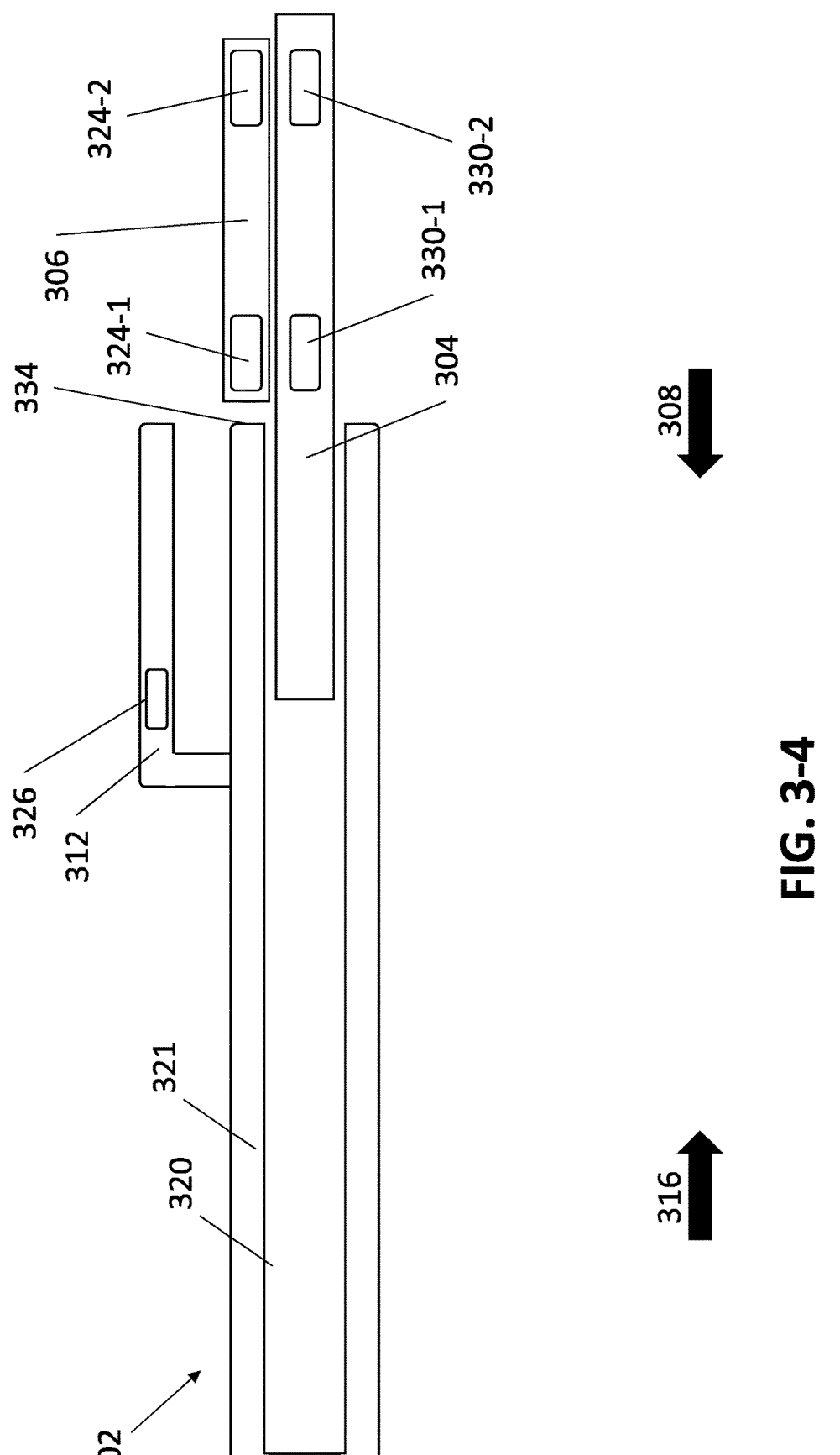
Figures 1, 4:
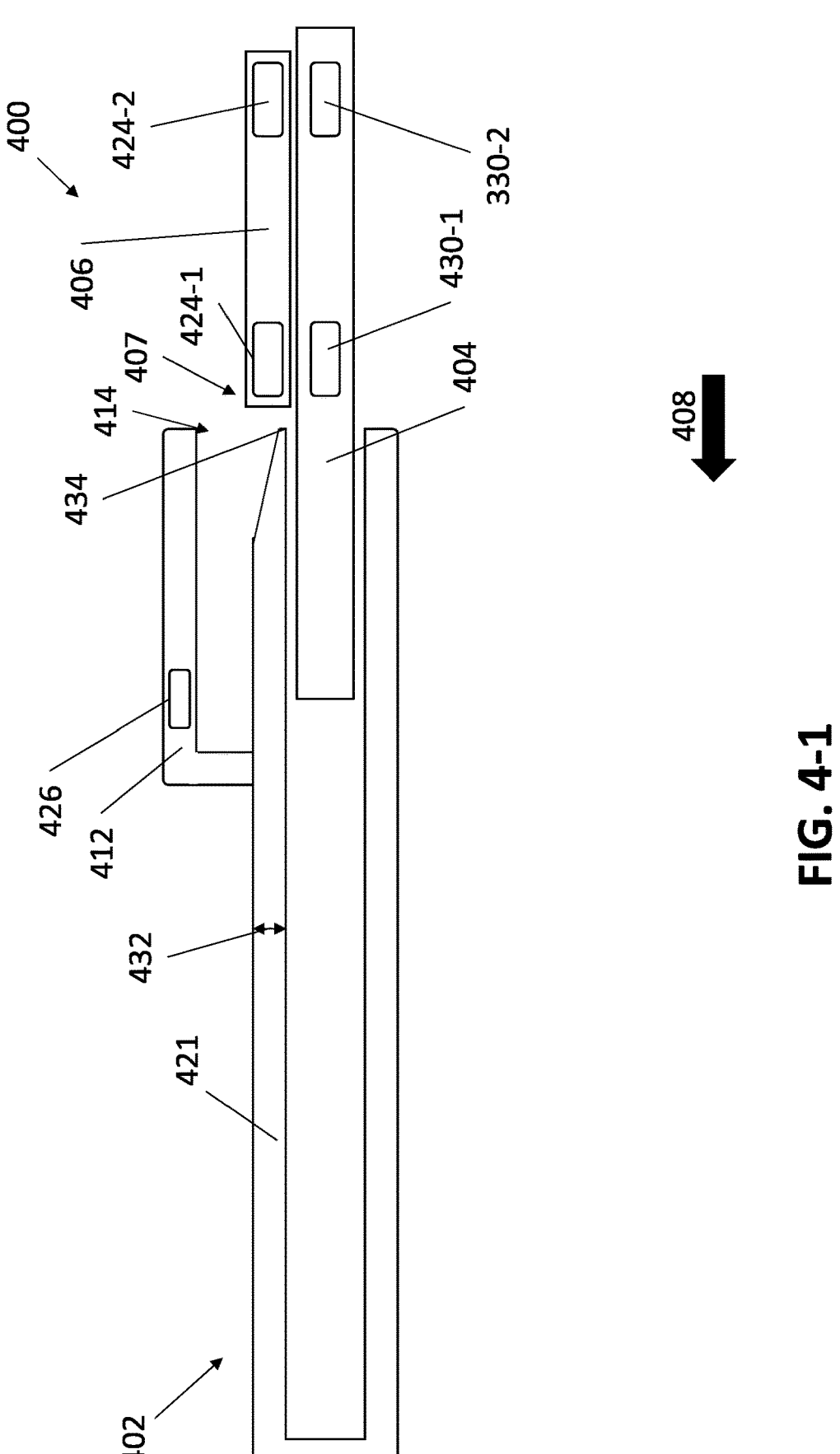
Figures 2, 4:
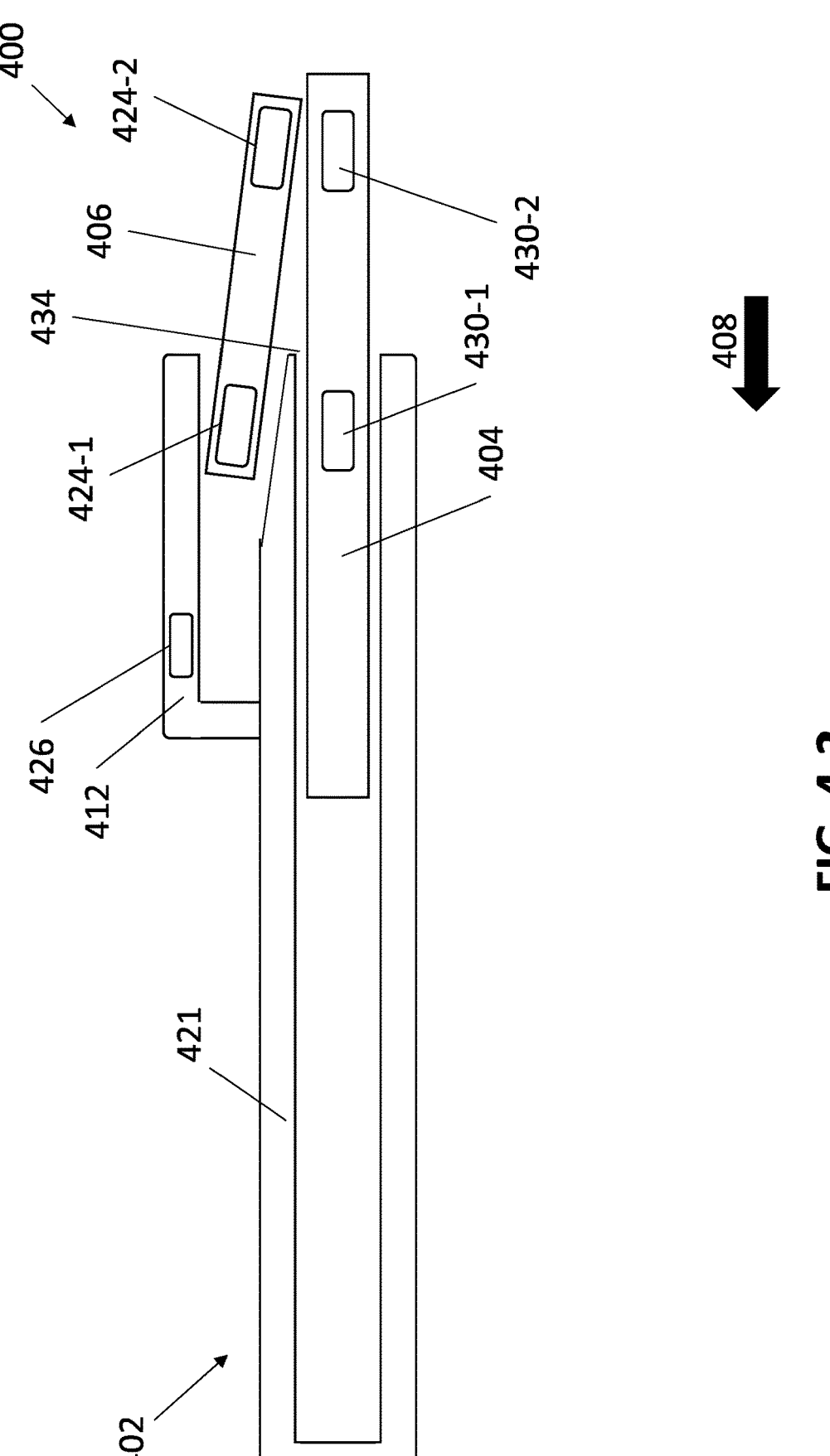
Figure 5:
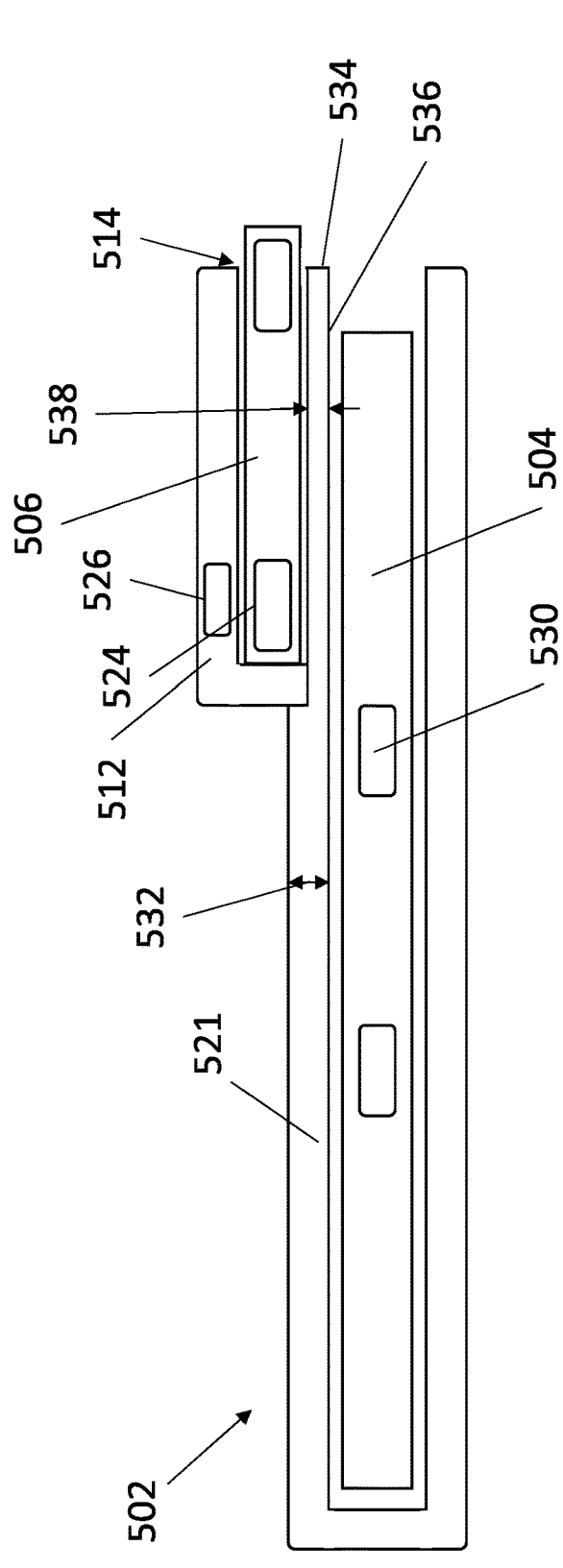

FIG. 5 is a representation of a storage element 500 with a device sleeve having a thinned slot strip 536, according to at least one embodiment of the present disclosure. In some embodiments, an upper member 521 of the device sleeve 502 includes a slot strip 536 at an accessory slot 512. The slot strip 536 may have a strip thickness 538 that is less than a member thickness 532 of the upper member 521. When the computing device 504 is inserted into the device sleeve 502 with a connected accessory 506, the reduced strip thickness 538 of the slot strip 536 may make it easier for the accessory 506 to be inserted into the accessory slot 512.

In some embodiments, the slot strip 536 may be formed from the same material as the upper member 521. In some embodiments, the slot strip 536 may be formed from a different material than the upper member 521. The material of the slot strip 536 may be selected to have different properties than the material of the upper member 521. For example, the slot strip 536 may have a higher coefficient of friction, a lower coefficient of friction, a higher magnetic permeability, a lower magnetic permeability, any other property, and combinations thereof. This may allow the designer to specialize the design of the storage element 500 for a particular application. For example, a low coefficient of friction at the slot strip 536 may improve the ease of installation of the accessory 506. A high coefficient of friction at the slot strip 536 may improve the retention of the accessory 506 within the accessory slot 512. A higher magnetic permeability at the slot strip 536 may improve the magnetic connection between the device magnets 530 on the device and the accessory magnets 524 on the accessory. A lower magnetic permeability may improve the connection between the slot magnet 526 and the accessory magnets 524.

In some embodiments, the slot strip 536 may be formed from an elastic material. When the accessory 506 is inserted into the accessory slot 512, the slot strip 536 may expand to receive the accessory 506. The slot strip 536 may then apply a compressive force or a retention force to the accessory 506 to retain the accessory 506 in the accessory slot 512. The retention force may be a friction force between the accessory 506 the slot strip 536, and the remainder of the accessory slot 512. In some embodiments, the accessory slot 512 may not include the slot magnet 526, and friction between the accessory 506, the slot strip 536, and the accessory slot 512 may retain the accessory 506 in the accessory slot. An elastic slot strip 536 may simplify the design of the accessory slot by removing the magnet, which may also reduce costs. In some embodiments, an elastic slot strip 536 may more reliably retain the accessory 506 in the accessory slot 512 because the accessory 506 may not because misaligned with any slot magnets 526 or other retention mechanism discussed herein. In some embodiments, the magnetic attraction between the device magnets 530 and the accessory magnets 524 may be sufficient to overcome the retention force and remove the accessory 506 from the accessory slot 512.

Figure 6:
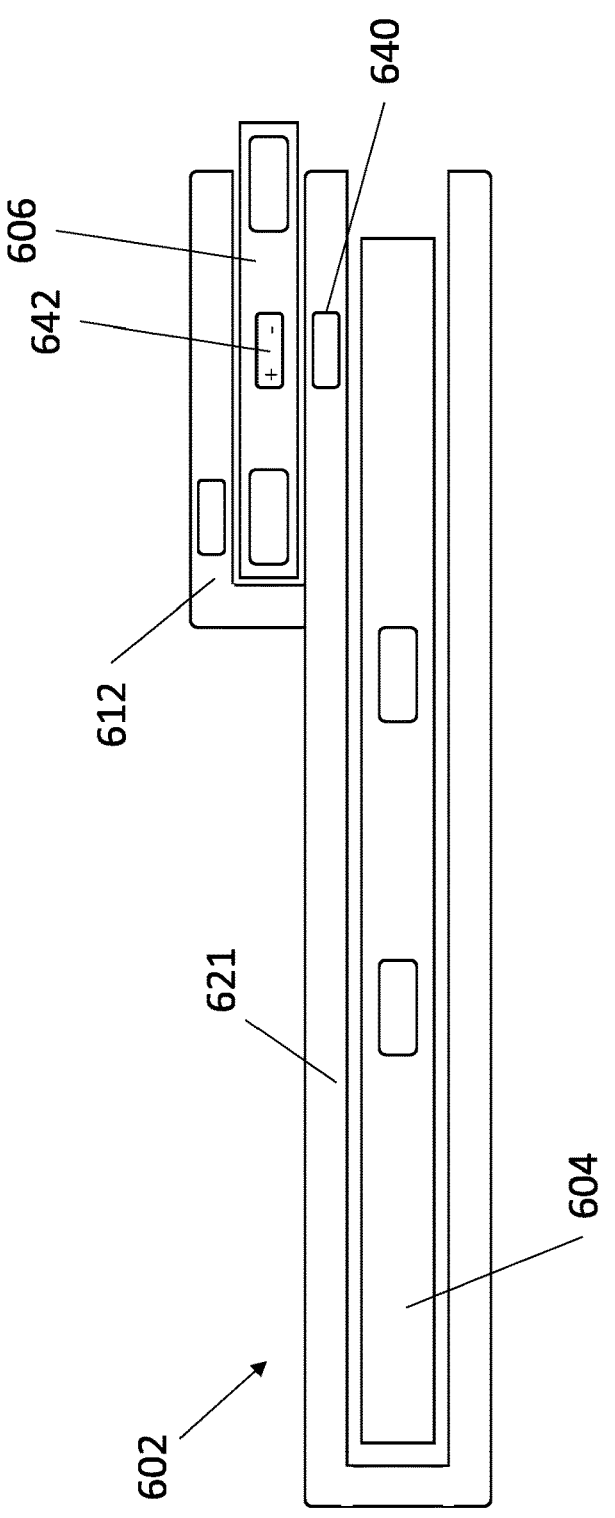
FIG. 6 is a representation of another storage element shown from a cutaway side view, according to at least one embodiment of the present disclosure.

FIG. 6 is a representation of a storage element 600 having a charging element 640 in a device sleeve 602, according to at least one embodiment of the present disclosure. In some embodiments, the accessory 606 may be a powered accessory powered by one or more batteries 642. In some embodiments, the batteries 642 may be rechargeable batteries. In some embodiments, the device sleeve 602 may include one or more charging elements 640 that are configured to charge the batteries 642 on the accessory 606. This may allow the batterie 642 to be charged while the accessory 606 is stored in the accessory slot 612.

In the embodiment shown, the charging element 640 is located in the upper member 621 at the accessory slot 612. The charging element 640 may be aligned with the batteries 642 in the accessory 606 so that the charging element 640 may charge the batteries 642. In some embodiments, the charging element 640 may be any type of charging element. For example, the charging element 640 may be a contact-based charging element. Contacts on the charging element 640 may align with contacts on the battery 642 when the accessory 606 is installed in the accessory slot. In some embodiments, the charging element 640 may utilize wireless charging to charge the battery 642. For example, the charging element may utilize electromagnetic induction, magnetic resonance, electric field coupling, radio reception, any other type of wireless charging, and combinations thereof.

Figure 7:
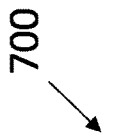
FIG. 7 is a representation of yet another storage element shown from a cutaway side view, according to at least one embodiment of the present disclosure.
Figure 7:
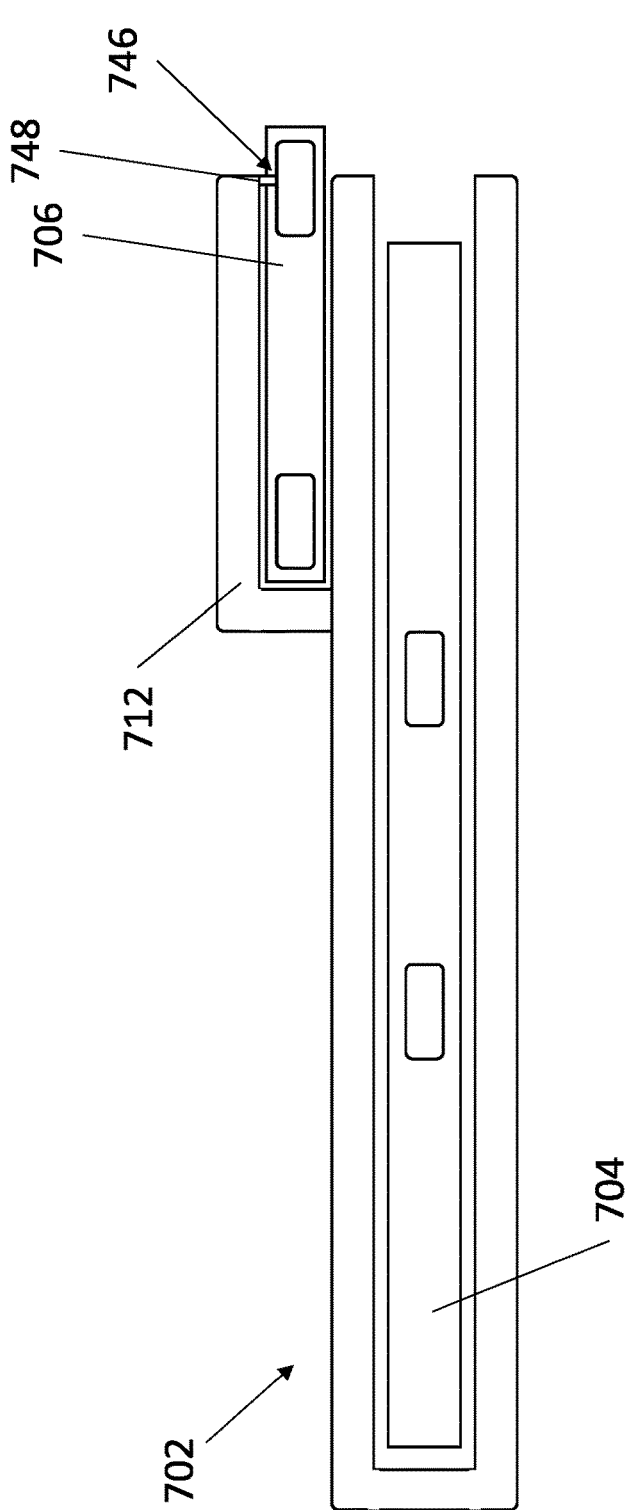

FIG. 7 is a representation of a storage element 700 having a pin latch to retain an accessory 706 in an accessory slot 712, according to at least one embodiment of the present disclosure. In some embodiments, the accessory 706 may include a detente 746. A pin 748 may extend from the accessory slot 712. When the accessory 706 is inserted into the accessory slot 712, the pin 748 may extend into the detente 746 to secure the accessory 706 within the accessory slot 712. The pin 748 inserted into the detente 746 may provide a retention force that may help to prevent removal of the accessory 706 from the accessory slot 712.

Figure 8:
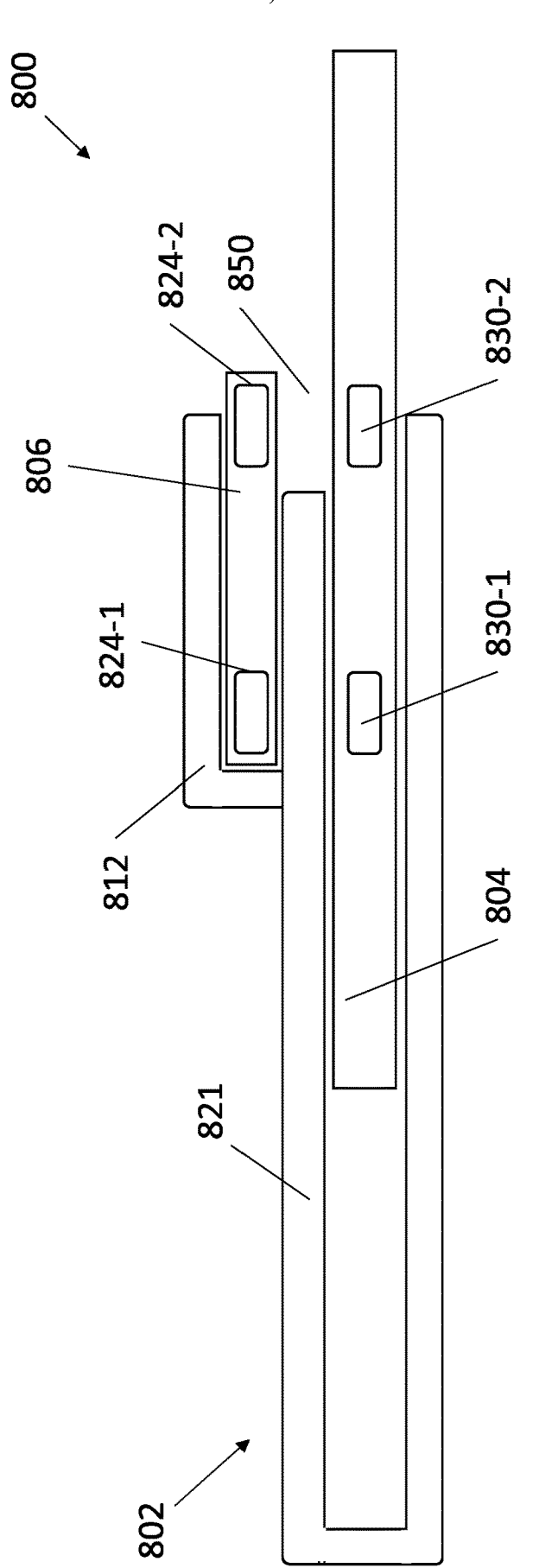
FIG. 8 is a representation of still another storage element shown from a cutaway side view, according to at least one embodiment of the present disclosure.

FIG. 8 is a representation of a storage element 800 having a notch 850 in an upper member 821 of a device sleeve, according to at least one embodiment of the present disclosure. In the embodiment shown, the accessory 806 is inserted in the accessory slot 812. The notch 850 may be a portion of the upper member 821 without any material, or with a reduced amount of material. In some embodiments, the notch 850 may make removal of the accessory from the accessory slot 812 easier. For example, the notch 850 may located at the end of the accessory slot 812 and remove the material between the second device magnet 830-2 and the second accessory magnet 824-2. During removal of the computing device 804, this may increase the magnetic connection between the second device magnet 830-2 and the second accessory magnet 824-2. This may make removal of the accessory 806 easier. In this manner, the accessory may reliably be removed from the accessory slot 812 when the accessory 806 is removed.

In some embodiments, the upper member 821 may have a magnetic permeability. The magnetic permeability of the upper member 821 may interfere with the magnetic connection between the device magnets 830 and the accessory magnets 824. The notch 850 may reduce or eliminate any magnetic resistance between the device magnets 830 and the accessory magnets 824. The magnetic connection between the second device magnet 830-2 and the second accessory magnet 824-2 may be stronger than the magnetic connection between the first device magnet 830-1 and the first accessory magnet 824-1. When the computing device 804 is being removed, this increased connection between the second device magnet 830-2 and the second accessory magnet 824-2 may generate a removal force sufficient to remove the accessory 806 from the accessory slot.

Figure 9:
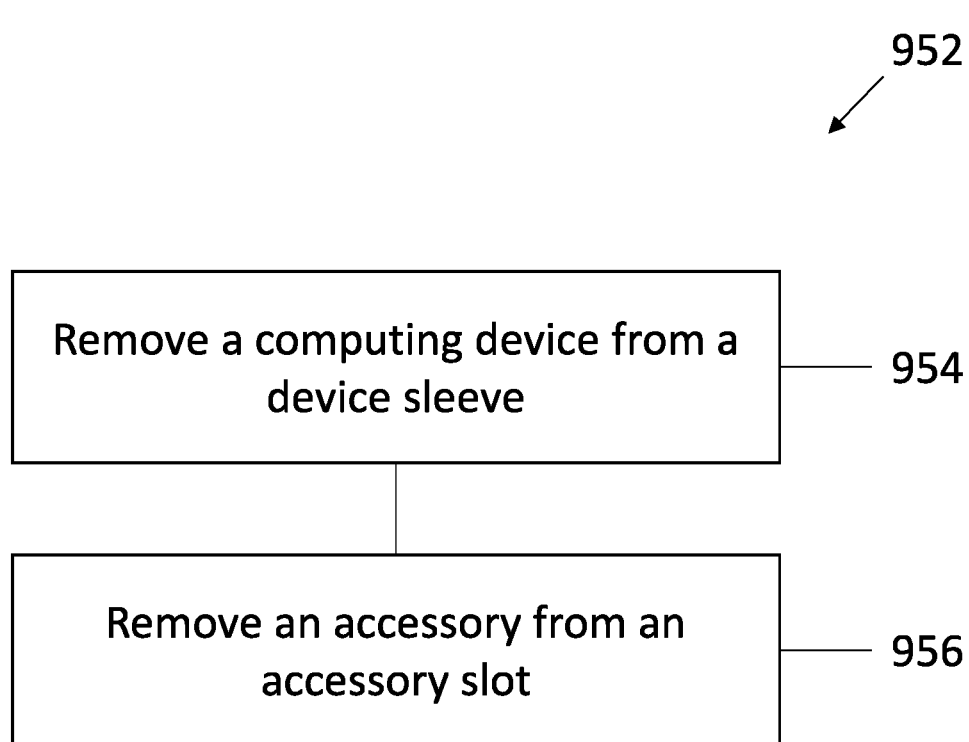
FIG. 9 is a flowchart of a method for storing a computing device, according to at least one embodiment of the present disclosure.

FIG. 9 is a flowchart of a method 952 for storing a computing device, according to at least one embodiment of the present disclosure. The method 952 includes removing the computing device from a device sleeve at 954. In some embodiments, the device sleeve may be a portion of a storage element, such as a backpack, a messenger bag, a briefcase, a purse, a box, any other storage element, and combinations thereof. While the computing device is being removed from the device sleeve, the method 952 may further include removing an accessory from an accessory slot on the device sleeve at 956. The accessory may be removed based at least in part on a magnetic connection between the accessory and the computing device. For example, the magnetic connection may apply a removal force to the accessory, and the accessory may be removed from the accessory slot using the removal force.

In some embodiments, after the accessory is removed, the method 952 may further include magnetically securing the computing accessory to the computing device. In some embodiments, the accessory may remain magnetically connected to the computing device while the accessory is located in the accessory slot. In some embodiments, removing the computing device may include laterally removing the computing device in a direction parallel to the computing device.

Figure 10:
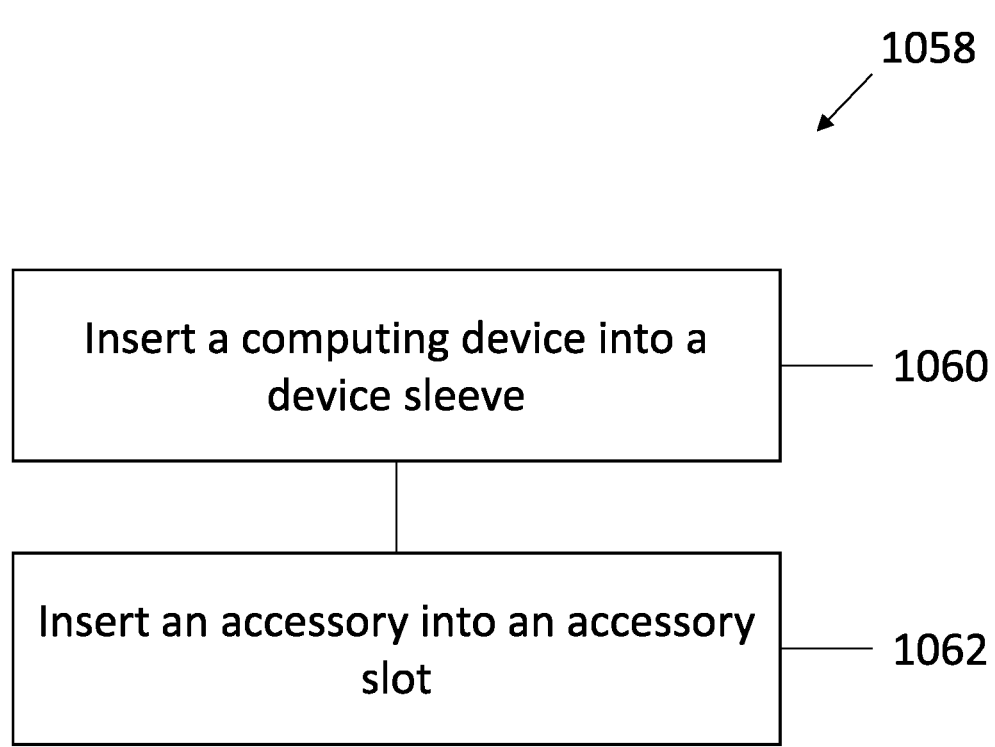
FIG. 10 is a flowchart of another method for storing a computing device, according to at least one embodiment of the present disclosure.

FIG. 10 is a representation of a method 1058 for storing a computing device, according to at least one embodiment of the present disclosure. The method 1058 may include inserting a computing device into a device sleeve at 1060. The device sleeve may be part of or connected to a storage element. In some embodiments, an accessory may be connected to the computing device prior to inserting the computing device into the device sleeve. In some embodiments, as the computing device is inserted into the device sleeve, the accessory may be inserted into an accessory slot on the device sleeve at 1062. In some embodiments, inserting the computing device into the accessory slot disconnects (e.g., magnetically disconnects) the computing accessory from the computing device.

In some embodiments, after inserting the accessory into the accessory slot, the method 1058 may further include connecting the accessory to the accessory slot with a connection mechanism. In some embodiments, the connection mechanism may include magnetically connecting the accessory to the accessory slot. In some embodiments, the method 1058 may further include charging the computing accessory in the accessory slot.

In one embodiment, a computing system kit includes a computing device with an outer surface. The outer surface includes a device magnet. The computing system kit includes an accessory with an accessory magnet. A magnetic interaction between the device magnet and the accessory magnet magnetically connects the accessory to the computing device. The computing system kit includes a device sleeve configured to receive the computing device. The device sleeve includes an accessory slot configured to receive the accessory. When the computing device is stored in the device sleeve, the device magnet is aligned with the accessory slot.

In some embodiments, a magnetic interaction between the device magnet and the accessory magnet causes the accessory to be removed from the accessory slot when the computing device is removed from the device sleeve. The accessory, in some embodiments, includes a stylus.

The accessory slot, in some embodiments, includes a retention mechanism to retain the computing accessory in the accessory slot. In some embodiments, the retention mechanism includes a friction fit between the accessory and the accessory slot. The retention mechanism, in some embodiments, includes a slot magnet. In some embodiments, the retention mechanism includes a pin latch.

In some embodiments, when the accessory is located in the accessory slot, a portion of the accessory extends out of the accessory slot. The accessory slot, in some embodiments, is separated from the computing device sleeve with a slot strip. In some embodiments, the slot strip is made from a different material than the computing device sleeve.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A storage element for storing a computing device and an accessory, comprising:
  a device sleeve configured to receive said computing device in a pocket of the device sleeve, wherein the pocket has a device insertion direction and wherein the pocket is at least partially defined by an upper member;
  an accessory slot configured to receive said accessory, wherein:
    the upper member at least partially defines the accessory slot;
    the accessory slot is separated from the pocket by the upper member; and
    the accessory slot has an accessory insertion direction; and
  wherein:
    said computing device includes a device magnet configured to magnetically connect to an accessory magnet of said accessory to connect said computing device to said accessory;
    when said computing device is positioned in the pocket and said accessory is positioned in the accessory slot, the upper member is positioned between the device magnet and the accessory magnet; and
    during insertion of said computing device into the pocket, said accessory automatically inserts into the accessory slot and is separated from said computing device by the upper member.

2. The storage element of claim 1, wherein the device insertion direction of the pocket and the accessory insertion direction of the accessory slot are parallel.

3. The storage element of claim 1, wherein the accessory slot includes a slot magnet configured to retain said accessory in the accessory slot.

4. The storage element of claim 3, wherein the slot magnet connects to said accessory with a lower magnetic force than the device magnet.

5. The storage element of claim 1, wherein the accessory slot includes a charging element for said accessory.

6. The storage element of claim 1, wherein the accessory slot includes a tapered opening edge.

7. The storage element of claim 1, wherein the accessory slot includes a flared opening.

8. The storage element of claim 1, wherein the accessory slot includes an opening that returns to an original shape after deformation.

9. The storage element of claim 1, wherein the pocket of the device sleeve comprises an opening, wherein the computing device can be inserted into and/or removed from the pocket through the opening.

10. A method for removing a computing device from a storage element, comprising:
  removing the computing device from a pocket of a device sleeve of the storage element in a device removal direction of the pocket, wherein the pocket is at least partially defined by an upper member of the device sleeve; and
  while removing the computing device from the device sleeve, removing an accessory from an accessory slot in an accessory removal direction that is parallel to the device removal direction, wherein the accessory slot is positioned on an outer surface of the upper member of the device sleeve such that the upper member is positioned between a device magnet of the computing device and an accessory magnet of the accessory, and wherein removing the accessory is based at least in part on a magnetic connection between the device magnet and the accessory magnet.

11. The method of claim 10, further comprising magnetically securing the accessory to the computing device with the upper member positioned therebetween when the accessory is located in the accessory slot and the computing device is located in the device sleeve.

12. The method of claim 10, wherein removing the computing device from the device sleeve automatically removes the accessory based on the magnetic connection between the accessory and the computing device.

13. The method of claim 11, wherein removing the accessory includes removing the accessory out of the accessory slot while the accessory is separated from the computing device by the upper member based on the magnetic connection between the accessory and the computing device.

14. The method of claim 12, wherein the accessory removal direction is parallel to a longitudinal orientation of the accessory.

15. The method of claim 10, further comprising magnetically retaining the accessory to the computing device after the computing device is removed from the device sleeve and after the accessory is removed from the accessory slot.

16. A method for storing a computing device, comprising:
  inserting a computing device into a pocket of a device sleeve of a storage element in a device insertion direction, wherein the pocket is at least partially defined by an upper member of the device sleeve, the computing device having an accessory magnetically connected to the computing device via a magnetic connection of an accessory magnet of the accessory to a device magnet of the computing device; and
  while inserting the computing device into the device sleeve, inserting the accessory into an accessory slot in an accessory insertion direction that is parallel to the device insertion direction, wherein the accessory slot is positioned on an outer surface of the upper member of the device sleeve such that the upper member is positioned between the device magnet and the accessory magnet.

17. The method of claim 16, wherein inserting the accessory into the accessory slot separates the accessory from the computing device based on the upper member being positioned between the accessory and the computing device.

18. The method of claim 16, further comprising, after inserting the accessory into the accessory slot, connecting the accessory to the accessory slot.

19. The method of claim 18, wherein connecting the accessory to the accessory slot includes magnetically connecting the accessory to the accessory slot.

20. The method of claim 16, further comprising charging a battery of the accessory in the accessory slot.

21. The method of claim 16, wherein the device sleeve includes a tapered opening edge at the accessory slot, and wherein inserting the accessory into the accessory slot includes separating the accessory from the computing device with the upper member using the tapered opening edge.

\* \* \* \* \*